United States Patent
Lee et al.

(10) Patent No.: US 11,059,438 B2
(45) Date of Patent: Jul. 13, 2021

(54) VEHICLE ON-BOARDING RECOGNITION METHOD AND ELECTRONIC DEVICE IMPLEMENTING SAME

(71) Applicant: Samsung Electronics Co., Ltd., Gyeonggi-do (KR)

(72) Inventors: Wonhee Lee, Gyeonggi-do (KR); Seungbeom Ryu, Gyeonggi-do (KR); Seoyoung Jin, Seoul (KR); Gongbo Moon, Gyeonggi-do (KR); Seung-Yoon Lee, Gyeonggi-do (KR); Taeho Kim, Chungcheongbuk-do (KR); Jeong-Min Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 16/098,491

(22) PCT Filed: May 4, 2017

(86) PCT No.: PCT/KR2017/004703
§ 371 (c)(1),
(2) Date: Nov. 2, 2018

(87) PCT Pub. No.: WO2018/026090
PCT Pub. Date: Feb. 8, 2018

(65) Prior Publication Data
US 2019/0143917 A1    May 16, 2019

(30) Foreign Application Priority Data
Aug. 1, 2016  (KR) ........................ 10-2016-0098227

(51) Int. Cl.
*B60R 16/03* (2006.01)
*B60R 21/015* (2006.01)
*B60R 16/023* (2006.01)

(52) U.S. Cl.
CPC ............ *B60R 16/03* (2013.01); *B60R 16/023* (2013.01); *B60R 21/01554* (2014.10)

(58) Field of Classification Search
CPC .. B60R 16/03; B60R 21/01554; B60R 16/023
See application file for complete search history.

(56) References Cited

U.S. PATENT DOCUMENTS

2006/0148490 A1*  7/2006  Bates ................ H04M 1/72577
                                                        455/456.1
2008/0108329 A1*  5/2008  Cho ........................ H04M 1/66
                                                        455/413

(Continued)

FOREIGN PATENT DOCUMENTS

JP       5225475 B2     7/2013
JP    2013-251595 A    12/2013

(Continued)

*Primary Examiner* — Carlos Amaya
(74) *Attorney, Agent, or Firm* — Cha & Reiter, LLC

(57) ABSTRACT

Various embodiments provide an electronic device and a method therefor, the electronic device comprising: at least one memory; a communication interface; one or more sensors; a location module; and at least one processor functionally connected to the at least one memory, the communication interface, the one or more sensors, and the location module, wherein the at least one processor is configured to acquire sensing data from at least one sensor among the one or more sensors, estimate a vehicle on-boarding state on the basis of the sensing data, and recognize, on the basis of the estimated vehicle on-boarding state, a vehicle on-boarding state by using the communication interface or the location module. Other embodiments are also possible.

16 Claims, 12 Drawing Sheets

(56) References Cited

U.S. PATENT DOCUMENTS

| | | | |
|---|---|---|---|
| 2013/0179107 | A1 | 7/2013 | Setoguchi et al. |
| 2013/0245986 | A1 | 9/2013 | Grokop et al. |
| 2014/0179348 | A1 | 6/2014 | Simon |
| 2016/0134744 | A1 | 5/2016 | de la Fuente Sanchez |
| 2017/0203767 | A1* | 7/2017 | Tibbitts .................... A61B 5/18 |
| 2018/0124233 | A1* | 5/2018 | Abramson .............. G06F 3/017 |

FOREIGN PATENT DOCUMENTS

| | | |
|---|---|---|
| KR | 10-2008-0034647 A | 4/2008 |
| KR | 10-2008-0040480 A | 5/2008 |
| KR | 10-2015-0100767 A | 9/2015 |
| KR | 10-1562235 B1 | 10/2015 |
| KR | 10-1614148 B1 | 4/2016 |

* cited by examiner

VEHICLE ON-BOARDING RECOGNITION METHOD AND ELECTRONIC DEVICE IMPLEMENTING SAME

CLAIM OF PRIORITY

This application is a National Phase Entry of PCT International Application No. PCT/KR2017/004703, which was filed on May 4, 2017 and claims a priority to Korean Patent Application No. 10-2016-0098227, which was filed on Aug. 1, 2016, the contents of which are incorporated herein by reference.

TECHNICAL FIELD

Various embodiments relate to vehicle boarding recognition method and apparatus.

BACKGROUND ART

With recent development of digital technology, an electronic device of various types such as a mobile communication terminal, a personal digital assistant (PDA), an electronic organizer, a smart phone, a tablet personal computer (PC), a wearable device are widely used. To support and enhance functionality, such an electronic device is continuously improved in a hardware portion and/or a software portion of the electronic device.

The electronic device may include at least one or more sensors. For example, using an acceleration sensor, the electronic device may determine that the electronic device is moving. If determining that a user walks or runs, the electronic device may provide a health service (e.g., a pedometer). Alternatively, if determining that the user boards a vehicle, the electronic device may provide a drive mode.

DISCLOSURE OF INVENTION

Technical Problem

Technique for recognizing in vehicle or not in vehicle using an acceleration sensor exhibits a low false recognition rate if displacement of the vehicle is considerable, but exhibits a high false recognition rate if the displacement of the vehicle is small. In addition, technique for recognizing in vehicle or not in vehicle using a communication state with an external device is subject to great current consumption of the electronic device. Further, if a speed of the vehicle is low, technique for recognizing in vehicle or not in vehicle using location information may not accurately determine a movement by vehicle or a movement on foot, by running, or by bicycle and thus is subject to a high false recognition rate.

Various embodiments may provide a method and an apparatus for recognizing an in vehicle state more accurately by use of at least one sensors and various information.

Solution to Problem

An electronic device according to various embodiments may include at least one memory, a communication interface, one or more sensors, a location module, and at least one processor functionally coupled to the at least one memory, the communication interface, the one or more sensors, and the location module, wherein the at least one processor may be configured to obtain sensing data from at least one sensor of the one or more sensors, to estimate an in vehicle state based on the sensing data, and to recognize an in vehicle estate using the communication interface or the location module based on the estimated in vehicle estate.

An electronic device according to various embodiments may include at least one memory, a communication interface, one or more sensors, a location module, and a first processor and a second processor functionally coupled to the at least one memory, the communication interface, the one or more sensors, and the location module, wherein the second processor may be configured to obtain network information from the communication interface, obtain location information from the location module, and forward the network information or the location information to the first processor, and the first processor may be configured to receive and store the network information or the location information in the at least one memory, obtain the sensing data from the one or more sensors, estimate an in vehicle state based on the sensing data, and recognize an in vehicle state using the network information or the location information stored in the at least one memory based on the estimated in vehicle state.

An operating method of an electronic device which includes a plurality of sensors according to various embodiments may include obtaining sensing data from at least one sensor of the plurality of the sensors, estimating an in vehicle state based on the sensing data, and performing a communication information based vehicle boarding recognition process based on the estimated in vehicle estate.

A computer readable recording medium according to various embodiments may include a program which executes an operation for obtaining sensing data from at least one sensor of the plurality of the sensors, an operation for estimating an in vehicle state based on the sensing data, and an operation for performing a communication information based vehicle boarding recognition process based on the estimated in vehicle estate.

Advantageous Effects of Invention

According to various embodiments, an in vehicle state may be recognized using at least one sensors and various information.

According to various embodiments, user's convenience may be improved, by automatically changing a mode of an electronic device to a car mode according to vehicle boarding, or by automatically providing various services which are available in the vehicle boarding.

According to various embodiments, by correcting misrecognized information by time of vehicle boarding identified, a false recognition rate according to the vehicle boarding may be lowered.

According to various embodiments, an in electric vehicle state may be recognized, by analyzing change characteristics of a magnetic field using a geomagnetic sensor and by analyzing engine sound using a sound sensor.

BEST MODE FOR CARRYING OUT THE INVENTION

Figure 1:
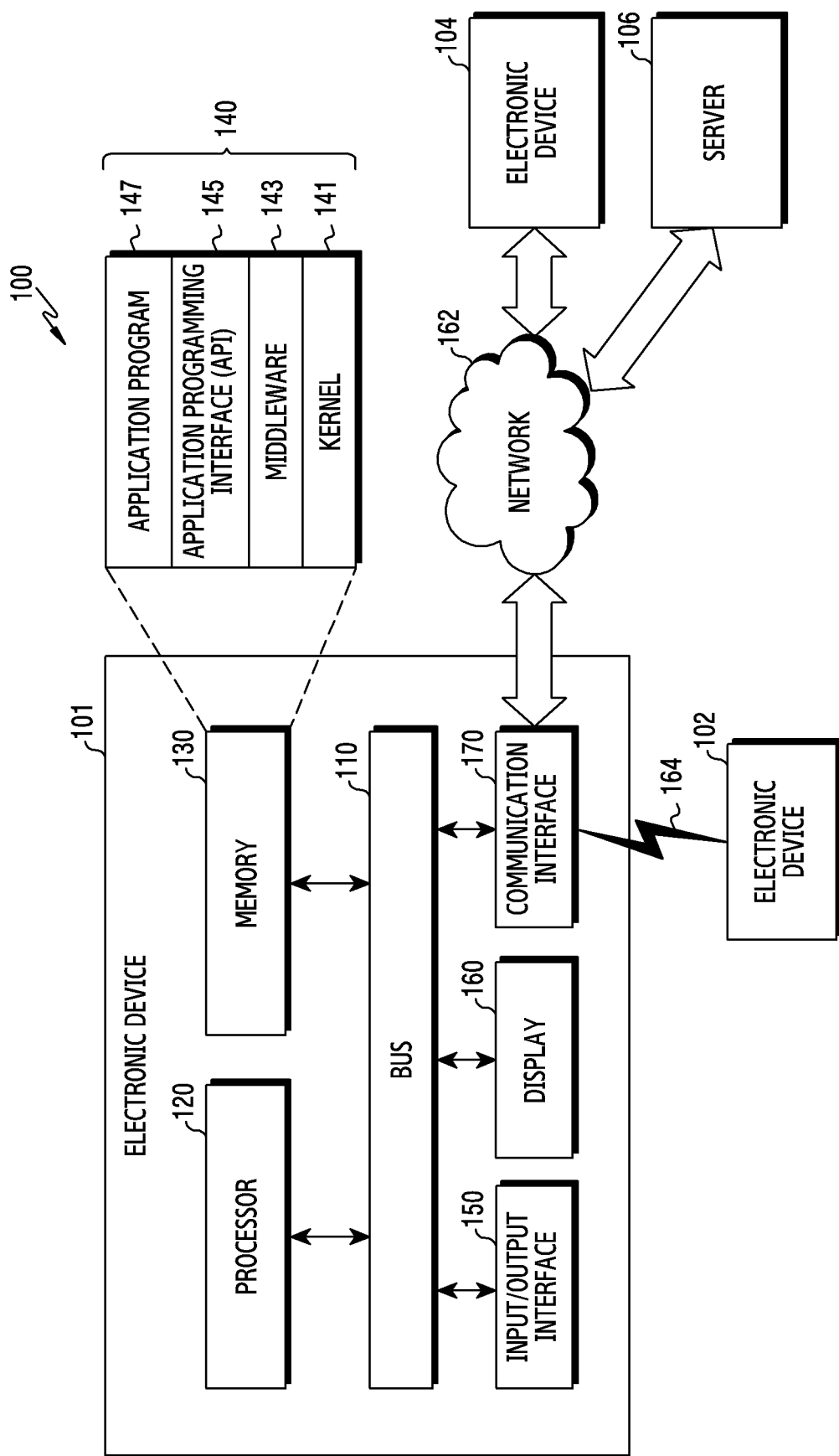
FIG. 1 is a diagram illustrating an electronic device in a network environment according to various embodiments.

Hereinafter, various embodiments of the present disclosure are disclosed with reference to the attached drawings. It should be understood that embodiments and terms used herein are not intend to limit technique described in the present disclosure to a particular embodiment form but, on the contrary, to cover various modifications, equivalents, and/or alternatives of the corresponding embodiments. In relation to descriptions of the drawings, like reference numerals may be used for similar components. The singular expression may include a plural expression unless the context clearly dictates otherwise. In the present disclosure, an expression such as "A or B" or "at least one of A and/or B" may include all possible combinations of items listed. Expressions such as "first" "second" "primarily" or "secondary" may represent various elements regardless of order or importance, are merely used to distinguish one element from other element, and do not limit corresponding elements. When it is described that an element (e.g., a first element) is "(operatively or communicatively) coupled" to or "connected" to another element (e.g., a second element), the element may be directly connected to the other element or may be connected through another element (e.g., a third element).

An expression "configured to (or set)" used in the present disclosure may be used interchangeably with, for example, in hardware or in software, "suitable for," "having the capacity to," "designed to," "adapted to," "made to," or "capable of" according to a situation. In some situations, the expression "apparatus configured to" may mean that the apparatus "can" operate together with another apparatus or component. For example, a phrase "a processor configured (or set) to perform A, B, and C" may indicate an exclusive processor (e.g., an embedded processor) for performing a corresponding operation, or a generic-purpose processor (e.g., as a central processing unit (CPU) or an application processor) which may perform corresponding operations by executing one or more software programs stored in a memory device.

An electronic device according to embodiments of the present disclosure may include, for example, at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MPEG 3 (MP3) player, a medical equipment, a camera, or a wearable device. The wearable device may include at least one of an accessory type (e.g., a watch, a ring, a bracelet, an ankle bracelet, a necklace, glasses, a contact lens, or a head-mounted-device (HMD)), a fabric or clothing embedded type (e.g., electronic garments), a body attachable type (e.g., a skin pad or a tattoo), or an implantable circuit. In some embodiments, the electronic device may include at least one of, for example, a television, a digital versatile disc (DVD) player, an audio, a refrigerator, an air-conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, or an electronic frame.

In another embodiment, the electronic device may include at least one of various medical devices (e.g., various portable medical measuring devices (a blood sugar measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, or an ultrasonic wave device), a navigation device, a global navigation satellite system (GNSS), an event data recorder (EDR), a flight data recorder (FDR), a vehicle infotainment device, electronic equipment for ship (e.g., a navigation device for ship and gyro compass), avionics, a security device, a head unit for a vehicle, an industrial or home robot, a drone, an automated teller machine (ATM) of a financial institution, a point of sales (POS) device of a store, or an Internet of things (IoT) device (e.g., a light bulb, various sensors, a sprinkler device, a fire alarm, a thermostat, a street light, a toaster, sports equipment, a hot water tank, a heater, and a boiler).

According to an embodiment, the electronic device may include at least one of a portion of furniture, building/construction or vehicle, an electronic board, an electronic signature receiving device, a projector, or various measuring devices (e.g., water supply, electricity, gas, or electric wave measuring device). In various embodiments, the electronic device may be flexible or a combination of two or more of the foregoing various devices. An electronic device according to an embodiment of the present disclosure is not limited to the foregoing devices. In the present disclosure, the term user may refer to a person using an electronic device or a device using an electronic device (e.g., an artificial intelligence electronic device).

FIG. 1 is a block diagram illustrating an electronic device 101 in a network environment 100 according to various embodiments.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include one or more of a Central Processing Unit (CPU), an Application Processor (AP), and a Communication Processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS). The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data. Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147, and may process the one or more task requests. The API 145 is an interface through which the applications 147 control functions provided from the kernel 141 or the middleware 143, and may include, for example, at least one interface or function (e.g., instruction) for file control, window control, image processing, character control, and the like. The input/output interface 150, for example, may function as an interface that may transfer commands or data input from a user or another external device to the other element(s) of the electronic device 101.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. According to one embodiment, the wireless communication may include, for example, at least one of wireless fidelity (WiFi), light fidelity (LiFi), wireless gigabit alliance (WiGig), Bluetooth, Bluetooth low energy (BLE), Zigbee, near field communication (NFC), magnetic secure transmission, radio frequency (RF), or a body area network (BAN).

According to one embodiment, the wireless communication may include a global navigation satellite system (GNSS). For example, the GNSS may be a global positioning system (GPS), a global navigation satellite system (Glonass), a Beidou navigation satellite system (hereinafter, referred to as "Beidou"), Galileo, or the European global satellite-based navigation system. Hereinafter, the "GPS" and the "GNSS" may be used interchangeably. The wire communication may include, for example, at least one of a universal serial bus (USB), a high definition multimedia interface (HDMI), a recommended standard 232 (RS-232), power line communication, or a plain old telephone service (POTS). The network 162 may include at least one of a telecommunication network such as a computer network (e.g., a LAN or a WAN), the Internet, and a telephone network.

Each of the first external device 102 and second external electronic device 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
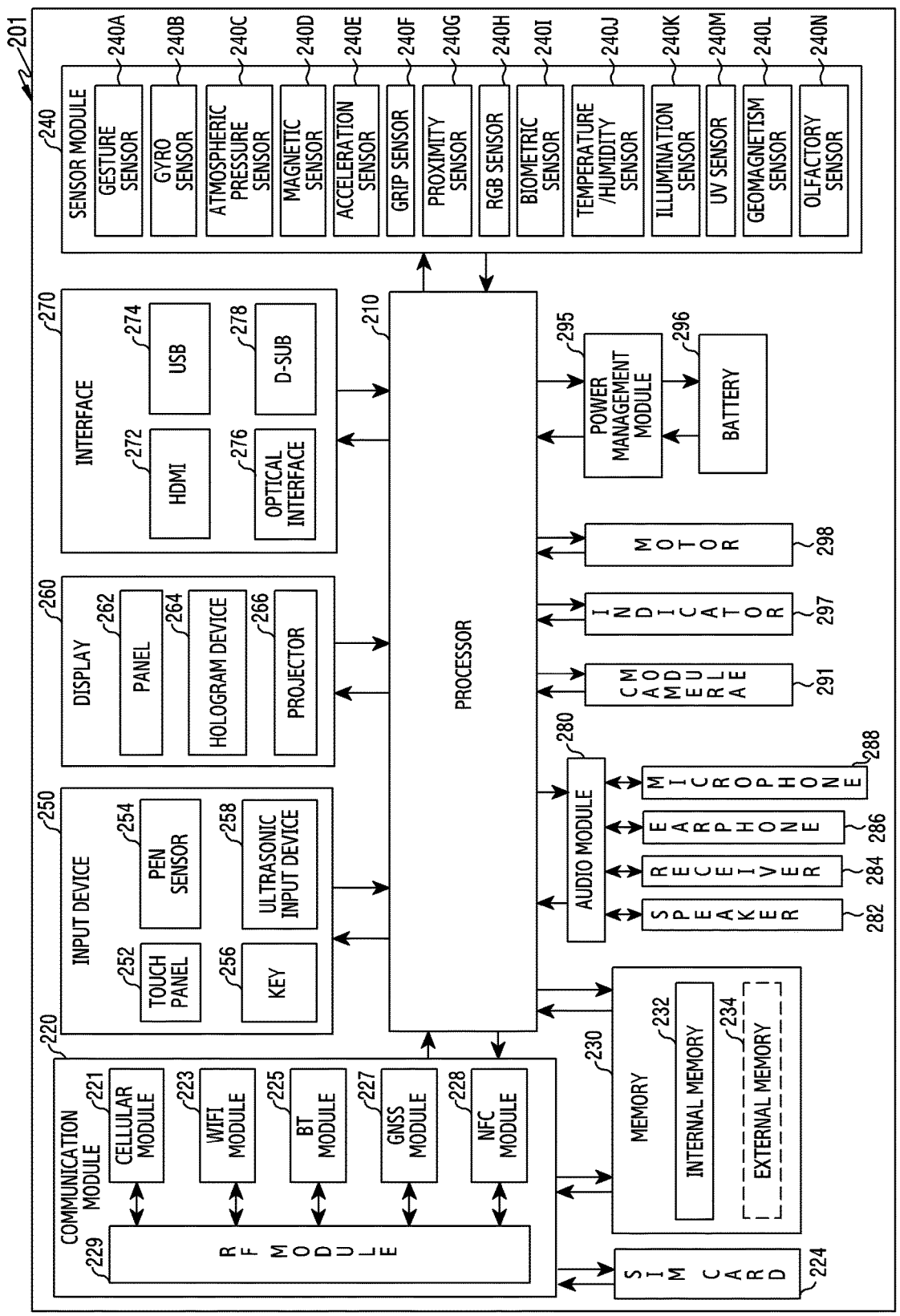
FIG. 2 is a block diagram illustrating a configuration of an electronic device according to various embodiments.

FIG. 2 is a block diagram illustrating an example electronic device according to various example embodiments of the present disclosure.

The electronic device 201 may include, for example, all or a part of the electronic device 101 illustrated in FIG. 1. The electronic device 201 may include one or more processors (e.g., including processing circuitry) 210 (e.g., Application Processors (AP)), a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module (e.g., including a camera) 291, a power management module 295, a battery 296, an indicator 297, and a motor 298.

The processor 210 may include various processing circuitry configured to control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include various communication circuitry, such as, for example, and without limitation, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229. The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package. The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module. The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 and/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like). The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 2401, a temperature/humidity sensor 240J, an illuminance (e.g., light) sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user. The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252.

The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266. The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/MultiMedia Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288. The camera module 291 may include various circuitry including, for example, and without limitation, a camera, a device which may photograph a still image and a video, or the like. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™. Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
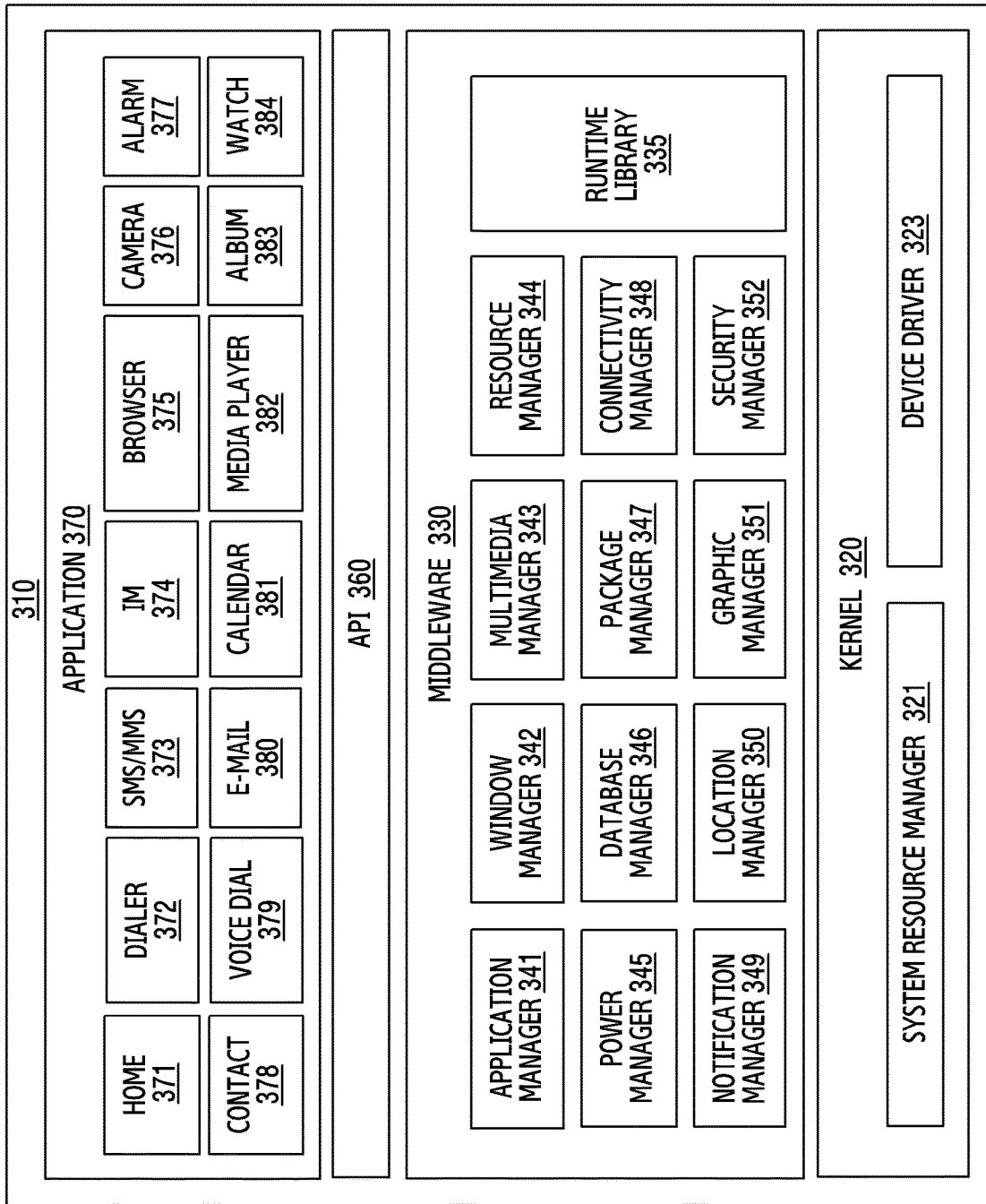
FIG. 3 is a block diagram illustrating a program module according to various embodiments.

FIG. 3 is a block diagram illustrating an example program module according to various example embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like. The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an example embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like. The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format.

The resource manager 344 may manage resources of a source code, a memory, and a storage space of at least one of the applications 370. The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components. The API 360 (e.g., the API 145) is, for example, a set of API programming functions, and may be provided with a different configuration according to an OS. For example, in the case of Android™ or iOS™, one API set may be provided for each platform. In the case of Tizen™, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, a contact 378, a voice dial 379, an email 380, a calendar 381, a media player 382, an album 383, a watch 384. According to various example embodiments, the application 370 may include an application for providing a health care (e.g., for measuring exercise quantity or blood sugar, etc.), or environment information (e.g., providing atmospheric pressure, humidity, or temperature information). According to an embodiment, the applications 370 may include an application (hereinafter, referred to as an "information exchange application" for convenience of description) that supports information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of delivering, to the external electronic device (for example, the electronic device 102 or 104), notification information generated by other applications (for example, an SMS/MMS application, an email application, a health care application, an environmental information application, and the like) of the electronic device 101. Furthermore, the notification relay application may, for example, receive notification information from the external electronic device and may provide the received notification information to a user. The device management application may manage (for example, install, delete, or update), for example, at least one function of an external electronic device (for example, the electronic device 102 or 104) that communicates with the electronic device (for example, a function of turning on/off the external electronic device itself (or some components thereof) or a function of adjusting the brightness (or resolution) of a display), applications that operate in the external electronic device, or services (for example, a call service, a message service, and the like) that are provided by the external electronic device. According to an embodiment, the applications 370 may include applications (for example, a health care application of a mobile medical appliance, and the like) designated according to the attributes of an external electronic device (for example, the electronic device 102 or 104). According to an embodiment, the applications 370 may include applications received from an external electronic device (for example, the server 106 or the electronic device 102 or 104). At least a part of the program module 310 may be implemented (e.g., executed) by software, firmware, hardware (e.g., the processor 210) or a combination of at least two or more of them, and may include a module for performing one or more functions, a program, a routine, sets of instructions or a process.

The term "module" used in the present disclosure may include a unit including hardware, software, and firmware, and, for example, may be interchangeably used with terms such as logic, logical block, component, or circuit. "module" may be an integral component or a minimum unit for performing one or more functions or its part. "module" may be mechanically or electrically implemented, and, for example, may include an application-specific integrated circuit (ASIC) chip, a field-programmable gate arrays (FPGAs), and a programmable-logic device, which are known or will be developed, for conducting certain operations. At least part of a device (e.g., modules or functions thereof) or a method (e.g., operations) according to various embodiments may be implemented with an instruction stored in a computer-readable storage medium (e.g., the memory 130) in the form of a program module. If the instruction is executed by a processor (e.g., the processor 120), the processor may perform a function corresponding to the instruction.

Hereinafter, an electronic device to be explained may be the electronic device 101 of FIG. 1 or the electronic device 201 of FIG. 2. For the sake of explanations, an electronic device will be described with the electronic device 201 of FIG. 2 as an example. However, the electronic device is not limited to the electronic device 201 of FIG. 2 by the descriptions.

Figure 4:
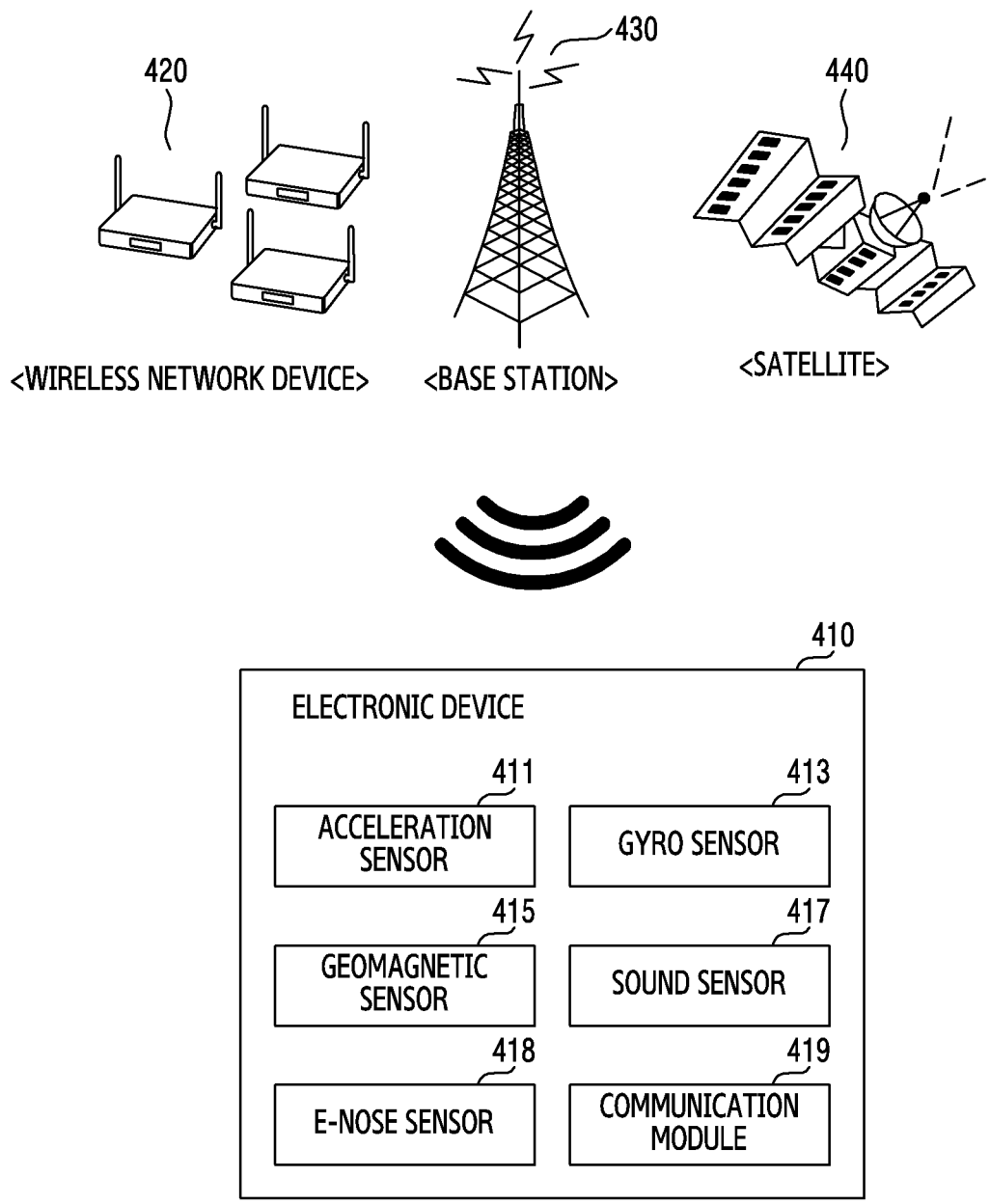
FIG. 4 is a diagram illustrating a vehicle boarding recognition system according to various embodiments.

FIG. 4 is a diagram illustrating a vehicle boarding recognition system according to various embodiments.

Referring to FIG. 4, the vehicle boarding recognition system may include an electronic device 410, a wireless network device 420, a base station 430 or a satellite 440. The vehicle boarding recognition system may recognize an in vehicle state of the electronic device 410 using the wireless network device 420, the base station 430 or the satellite 440.

The electronic device 410 (e.g., the electronic device 201) may include an acceleration sensor 411, a gyro sensor 413, a geomagnetic sensor 415, a sound sensor 417, an E-nose sensor 418, or a communication module 419. The acceleration sensor 411 (e.g., the acceleration sensor 240E) may sense (or detect) force of gravity or acceleration applied to the electronic device 410. The gyro sensor 413 (e.g., the gyro sensor 240B) may sense (or detect) a speed at which the electronic device 410 rotates. The geomagnetic sensor 415 (e.g., the geomagnetic sensor 240L) senses (or detects) the earth's magnetic field, and may sense a magnetic field change around the electronic device 410. The sound sensor 417 (e.g., the microphone 288) may sense (or detect) a sound (or sound waves) generating near the electronic device 410. The E-nose sensor 418 (e.g., the E-nose sensor 240N) may sense (or detect) carbon dioxide ($CO_2$) (or gas) generating near the electronic device 410. The E-nose sensor 418 may be represented as a gas sensor or an environment sensor.

A controller (e.g., the processor 210) included in the electronic device 410 according to various embodiments may determine whether a user carries the electronic device 410 and boards a vehicle using at least one of the acceleration sensor 411, the gyro sensor 413, the geomagnetic sensor 415, the sound sensor 417 or the E-nose sensor 418. The processor 210 may determine in vehicle or not in vehicle using at least one of information acquired by the one or more sensors and communication information obtained from the communication module 419.

The processor 210 according to various embodiments may include a first processor (e.g., a sensor hub processor) or a second processor (e.g., a main processor). The second processor may obtain communication information from the communication module 419 and forward it to the first processor. The first processor may store the communication information in at least one memory (e.g., the memory 230). The at least one memory (e.g., the memory 230) may be included in the first processor, and may be functionally connected to the first processor. Alternatively, the at least one memory may be functionally connected to the first processor and the second processor. The first processor may determine in vehicle or not in vehicle using the one or more sensors.

If determining in vehicle or not in vehicle using the one or more sensors, the first processor according to various embodiments may determine in vehicle or not in vehicle more accurately using the communication information (e.g., assisted data) stored in the at least one memory. Alternatively, if the communication information is not stored in the at least one memory, the first processor may determine in vehicle or not in vehicle using only the information obtained from the at least one sensor. Alternatively, if recognizing in vehicle, the first processor may wake up the second processor and forward information associated with the vehicle boarding recognized to the second processor, and the second processor may provide a service regarding the vehicle boarding.

The communication module 419 may include a mobile communication transceiving unit, a wireless network transceiving unit, or a location module. For example, the mobile communication transceiving unit (e.g., the cellular module 221) may obtain base station information from the base station 430 connected to the electronic device 410. The processor 210 may determine movement or not based on the base station information which changes over time. The wireless network transceiving unit (e.g., the WiFi module 223) may obtain wireless network information of the wireless network device 420 (e.g., a WiFi access point device) scanned (or detected) by the electronic device 410. The processor 210 may generate a MAC address list by scanning the wireless network device 420 connected to the electronic device 410, and determine whether it moves or not based on the MAC address list. The location module (e.g., the GNSS module 227) may calculate location information by receiving a satellite signal from the satellite 440. For example, the location module may calculate a distance between the satellite 440 and a receiving unit by measuring time taken for the signal transmitted from the satellite 440 to reach the receiving unit, and thus calculate a current location. The processor 210 may determine the movement (or fast movement) based on the location information which changes per hour.

For example, if any one sensor estimates the vehicle boarding and the movement information obtained through the communication module 419 corresponds to vehicle movement information (e.g., over 20 Km/h), the processor 210 may recognize that the user boards the vehicle.

The controller (e.g., the processor 210) included in the electronic device 410 according to various embodiments may execute a sensor based vehicle boarding recognition process by sequentially driving at least one sensor among a plurality of sensors. According to one embodiment of the present invention, battery consumption of the electronic device 410 may be reduced, by determining in vehicle or not in vehicle by operating only some sensors if necessary, rather than driving every sensor at the same time (at a time). The controller (e.g., the processor 210) included in the electronic device 410 according to various embodiments may perform the sensor based vehicle boarding recognition process and then, if the vehicle boarding is estimated, perform an information based vehicle boarding recognition process.

Hereinafter, operations of performing the vehicle boarding recognition process are described with FIG. 5.

Figure 5:
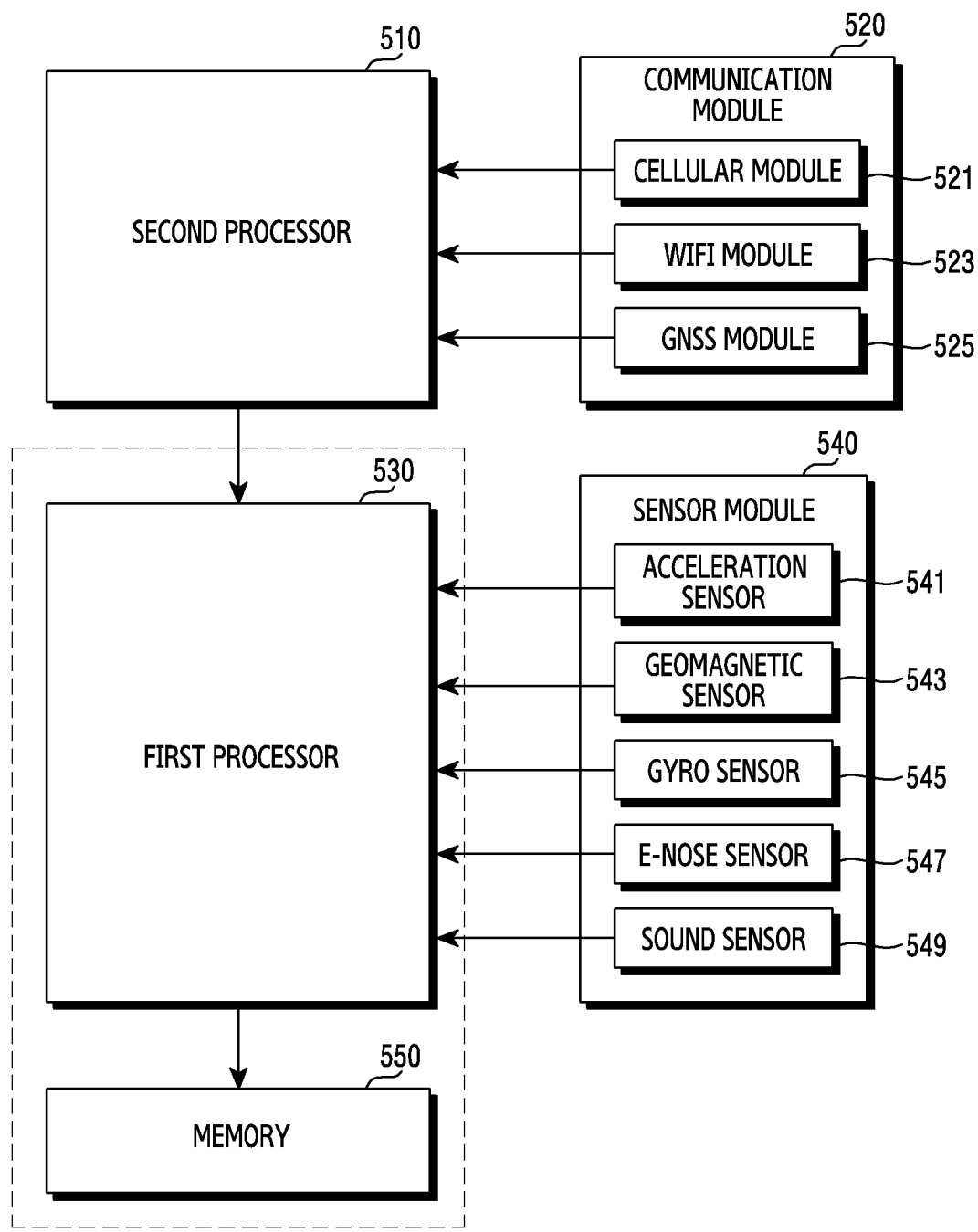
FIG. 5 is a diagram illustrating a configuration of an electronic device according to various embodiments.

FIG. 5 is a diagram illustrating a configuration of an electronic device according to various embodiments.

Referring to FIG. 5, an electronic device (e.g., the electronic device 201) may include a first processor 530, a second processor 510, a communication module 520, a sensor module 540 or at least one memory 550. The at least one memory 550 may be included in the first processor 530, or may be located outside the first processor 530 and functionally connected to the first processor 530.

The second processor 510 may selectively operate if necessary. For example, the second processor 510 may operate in an active state (e.g., an operation mode) if the display 260 is turned on, information is obtained, or information is scanned. In addition, the second processor 510 may operate in an inactive state (e.g., a sleep mode) if the display 260 is turned off. That is, the second processor 510 may operate in the inactive state (e.g., the sleep mode), and wake up to obtain information from the communication module 520 according to at least one of a periodic basis, a set scan period, or an application operation period (or an application information request).

The second processor 510 may obtain the communication information from the communication module 520. The communication information may include base station information, wireless network information or location information. The second processor 510 may forward the communication information to the first processor 530 and switch to the sleep mode. The second processor 510 may forward information to the first processor 530 on a periodic basis or for every information acquisition.

The communications module 520 may include a cellular module 521, a WiFi module 523, or a GNSS module 525. The cellular module 521 (e.g., the cellular module 221) may obtain base station information connected to the electronic device 201. The WiFi module 523 (e.g., the WiFi module 223) may obtain wireless network information from a wireless network device (e.g., the wireless network device 420) scanned (or detected) by the electronic device 201. The GNSS module 525 (e.g., the GNSS module 227) may receive a satellite signal from a satellite (e.g., the satellite 440), and thus calculate location information.

If power is applied to the electronic device 201, the first processor 530 according to various embodiments may always operate (e.g., the active state, the operation mode). While the power is applied to the electronic device 201, the first processor 530 may wake up all the time and receive sensing data from the sensor module 540. In addition, the first processor 530 may receive the communication information from the second processor 510, and store the communication information in the at least one memory 550. The first processor 530 may passively receive the communication information from the second processor 510 regardless of the vehicle boarding recognition, and store it in the at least one memory 550. The first processor 530 may always wake up regardless of whether the display 260 of the electronic device 201 is turned on/off. The first processor 530 may be driven with low power compared to the second processor 510. The first processor 530 according to various embodiments may determine in vehicle or not in vehicle based on the sensing data received from the sensor module 540. If more accurate determination is required as a result of determining in vehicle or not in vehicle based on the sensing data, the first processor 530 may determine in vehicle or not in vehicle using the communication information stored in the at least one memory 550. That is, the first processor 530 may monitor a change degree of the communication information, and finally determine in vehicle or not in vehicle.

The first processor 530 according to various embodiments may monitor a vibration pattern transmitted to the electronic device 201 using acceleration information obtained from the acceleration sensor 541. If the vibration pattern is the same as or similar to a vibration pattern generating in the vehicle boarding, the first processor 530 may recognize that the user carrying the electronic device 201 boards the vehicle. For example, if the user gets on the vehicle which utilizes an internal combustion engine and then the vehicle starts, the first processor 530 may determine that the vibration pattern detected by the acceleration sensor 541 is similar to the vibration pattern detected in the vehicle start. In this case, the first processor 530 may determine that the user is on board the vehicle.

The first processor 530 according to various embodiments may monitor a magnetic change pattern of the electronic device 201 using geomagnetic information obtained from the geomagnetic sensor 543. For example, in an electric vehicle, motor is installed on a wheel of the electric vehicle, and accordingly output of the geomagnetic sensor 543 may change. The first processor 530 may detect whether the user boards the electric vehicle by analyzing change characteristics of the magnetic field. The first processor 530 may monitor a sound pattern using the sound information obtained from the sound sensor 549. For example, if detecting the magnetic change pattern and determining that the sound pattern is similar to engine sound characteristics, the first processor 530 may determine that the user boards the electric vehicle.

The first processor 530 according to various embodiments may monitor a position change using rotation information obtained from the gyro sensor 545. If the user drives a car, a position change pattern may be detected during the driving. Alternatively, if the user is sitting in the car, a sitting position change pattern may be detected. If the vibration pattern is similar to the vibration pattern detected in the vehicle start and the monitored position change is the same as or similar to the position change pattern of the driving or sitting state, the first processor 530 may determine that the user boards the vehicle.

The first processor 530 according to various embodiments may monitor a concentration (or gas concentration) of carbon dioxide using olfactory information obtained from the E-nose sensor 547. If the user is placed in an enclosed space such as a vehicle, the first processor 530 may detect a high carbon dioxide concentration which is different from outside. If the vibration pattern is similar to the vibration pattern detected in the vehicle start and the carbon dioxide concentration corresponds to an indoor reference value, the first processor 530 may determine that the user boards the vehicle. Alternatively, if the position change pattern is similar to the position change pattern of the driving or sitting state and the carbon dioxide concentration corresponds to the indoor reference value, the first processor 530 may determine that the user boards the vehicle.

The first processor 530 according to various embodiments may track at least one user activity of the in vehicle state, the walking state, the running state, or the halt state by utilizing the sensor module 540 or various components of the electronic device 201. The first processor 530 may compensate for the sensor based vehicle boarding recognition process using the user activity and the sensing data. For example, if determining the walking or running state based on the user activity, the first processor 530 may ignore the vehicle boarding, which is estimated using the sensing data. Alternatively, if determining the walking or running state according to the user activity and estimating the vehicle boarding using the sensing data, the first processor 530 may improve accuracy of the vehicle boarding recognition using the communication information stored in the at least one memory 550.

The first processor 530 according to various embodiments may monitor a change of the base station information by extracting the base station information from the at least one memory 550. For example, if the number of base stations which changes per hour exceeds a communication network change value, the processor 210 may determine that the user boards the vehicle. The first processor 530 may extract the wireless network information from the at least one memory 550 and monitor a change of the wireless network information. For example, if the wireless network information which changes per hour exceeds a network change value, the first processor 530 may determine that the user boards the vehicle. Alternatively, if the change of the base station information and the change of the wireless network information exceed a reference change value, the processor 210 may determine that the user boards the vehicle.

The first processor 530 according to various embodiments may extract the location information from the at least one memory 550 and monitor a change of the location information. For example, if location change information exceeds a reference speed (e.g., 20 km/h), the first processor 530 may determine that the user boards the vehicle. Alternatively, if the number of the base stations which change per hour exceeds a reference communication network change value and the location information change exceeds the reference speed, the first processor 530 may determine that the user boards the vehicle. The first processor 530 may determine that the user boards the vehicle, if the wireless network information which changes per hour exceeds a reference network change value and the location information change exceeds the reference speed.

If determining in vehicle or not in vehicle using the sensing data detected by the sensor module 540, the first processor 530 according to various embodiments may determine in vehicle or not in vehicle more accurately using the communication information stored in the at least one memory 550. Alternatively, if the communication information is not stored in the at least one memory 550, the first processor 530 may determine in vehicle or not in vehicle using only the sensing data acquired by the sensor module 540.

An electronic device according to various embodiments may include at least one memory, a communication interface, one or more sensors, a location module, and at least one processor functionally coupled to the at least one memory, the communication interface, the one or more sensors, and the location module, wherein the at least one processor may be configured to obtain sensing data from at least one sensor of the one or more sensors, to estimate an in vehicle state based on the sensing data, and to recognize an in vehicle estate using the communication interface or the location module based on the estimated in vehicle estate.

The at least one processor may include a first processor and a second processor, the second processor may be configured to obtain network information from the communication interface or location information from the location module, and the first processor may be configured to obtain the sensing data from the one or more sensors.

The first processor may be always in an active state, and if transmitting the network information or the location information to the first processor, the second processor may be configured to operate selectively in an active state.

If the sensing data corresponds to a first vehicle boarding condition, the at least one processor may be configured to obtain network information from the communication interface.

The at least one processor may be configured to monitor the network information from the communication interface, and if the network information corresponds to a second vehicle boarding condition, obtain location information from the location module.

The at least one processor may be configured to stop obtaining the network information if the network information does not correspond to the second vehicle boarding condition.

The at least one processor may be configured to monitor the location information, and to recognize the in vehicle state if the location information corresponds to a third vehicle boarding condition.

The at least one processor may be configured to stop obtaining the location information if the location information does not correspond to the third vehicle boarding condition.

The at least one processor may be configured to monitor first sensing data from a first sensor, and to drive a second sensor if the first sensing data satisfies a first sensing condition.

The first sensor may be configured to include a geomagnetic sensor or an acceleration sensor.

The at least one processor may monitor second sensing data from the second sensor, and control to perform an information based vehicle boarding recognition process using the communication interface or the location module if the second sensing data satisfies a second sensing condition.

The second sensor may be configured to include at least one of a gyro sensor, an E-nose sensor or a sound sensor.

The at least one processor may be configured to stop driving the second sensor if the second sensing data does not satisfy the second sensing condition.

The at least one processor may be configured to apply different confidence levels to the plurality of the sensors, and to estimate an in vehicle state based on the sensing data and the sensor confidence levels.

The at least one processor may be configured to apply different confidence levels to the plurality of the sensors, the communication interface, and the location module, and to estimate an in vehicle state based on the sensing data, network information, location information or the applied confidence level.

An electronic device according to various embodiments may include at least one memory, a communication interface, one or more sensors, a location module, and a first processor and a second processor functionally coupled to the at least one memory, the communication interface, the one or more sensors, and the location module, wherein the second processor may be configured to obtain network information from the communication interface, obtain location information from the location module, and forward the network information or the location information to the first processor, and the first processor may be configured to receive and store the network information or the location information in the at least one memory, obtain the sensing data from the one or more sensors, estimate an in vehicle state based on the sensing data, and recognize an in vehicle state using the network information or the location information stored in the at least one memory based on the estimated in vehicle state.

The first processor may be always in an active state, and the second processor may be configured to operate selectively in an active state if transmitting the network information or the location information to the first processor, and to switch to a sleep state if the transmission of the network information or the location information is finished.

The at least one memory may be configured to be included in the first processor, or to be positioned outside the first processor.

Figure 6:
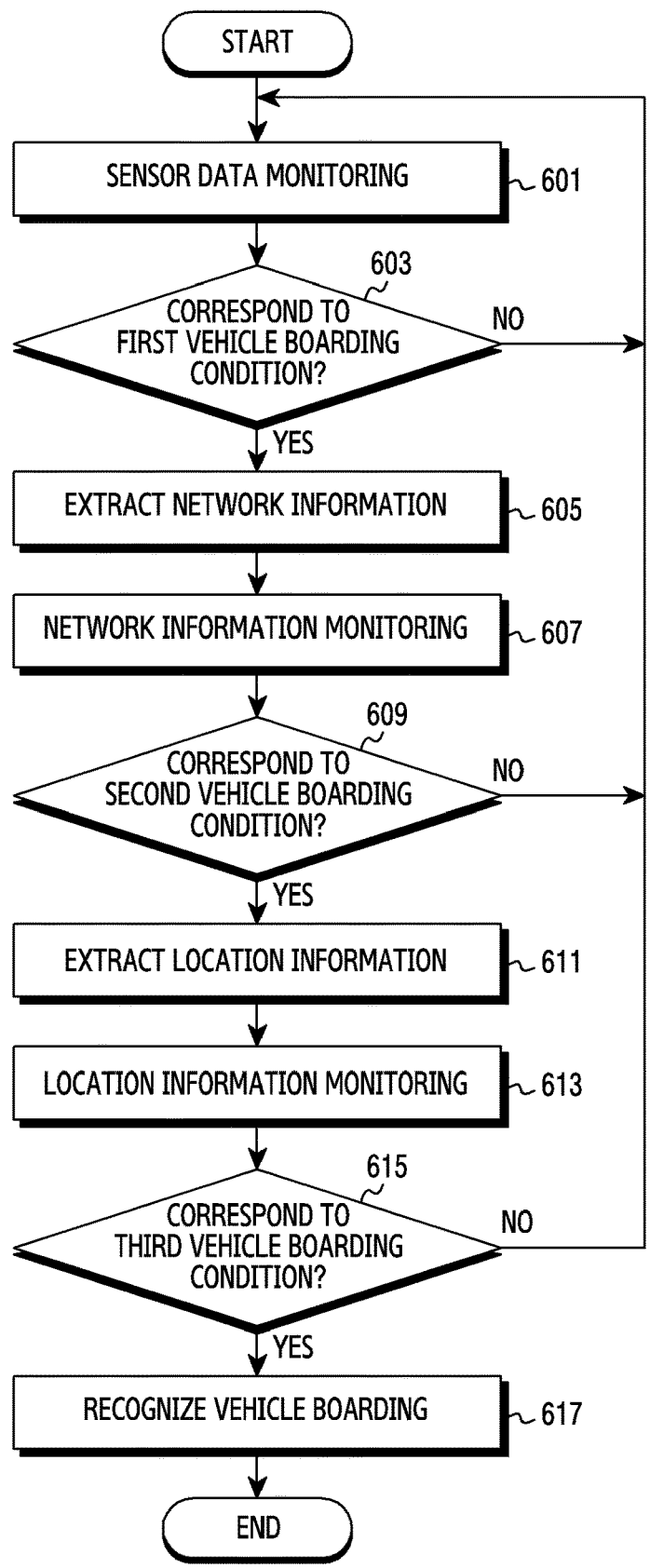
FIG. 6 is a flowchart illustrating an operating method of an electronic device according to various embodiments.

FIG. 6 is a flowchart illustrating an operating method of an electronic device according to various embodiments.

Referring to FIG. 6, in operation 601, the electronic device 201 (e.g., the first processor 530) may monitor sensor data (e.g., the sensing data 521). The first processor 530 according to various embodiments may obtain the sensor data from at least one sensor of a plurality of sensors and monitor the obtained sensor data. For example, the first processor 530 may not drive every sensor at the same time (or at a time), and may determine in vehicle or not in vehicle using only the at least one sensor in order. That is, the first processor 530 may gradually perform the multiple sensing to determine in vehicle or not in vehicle. If the second processor 510 is in the sleep state, the first processor 530 may determine in vehicle or not in vehicle using the sensor data.

For example, current consumption may differ for each sensor, and a confidence level for determining in vehicle or not in vehicle may differ for each sensor. The first processor 530 may determine a sensor to operate among the plurality of the sensors based on at least one of the determination criterion (e.g., in vehicle or not in vehicle, walking/running, etc.), the current consumption, and the confidence level. The confidence level may be set by the user, or may be set by default in the electronic device 201. Alternatively, the electronic device 201 may have a sensor which is always driving with low current consumption. The first processor 530 may monitor the sensor data obtained from the sensor (e.g., a first sensor) which is always driving, and determine whether to drive another sensor (e.g., a second sensor) based on a monitoring result.

The first processor 530 according to various embodiments may obtain first sensor data from the first sensor (e.g., the geomagnetic sensor 240L, the acceleration sensor 204E), and monitor the obtained first sensor data. For example, the first processor 530 may determine whether the first sensor data detects a unique pattern which may exhibit in an environment in the vehicle. If the vehicle starts, unique features exhibit based on vehicle characteristics and the electronic device 201 may measure the exhibited features through the first sensor. Determining in vehicle or not in vehicle through the first sensor may have a low confidence level. For example, the confidence level may be represented with high, mid, low, or digits from 1~5. The confidence level may be set by the user or may be set by default in the electronic device 201.

The first processor 530 according to various embodiments may determine in vehicle or not in vehicle based on the first sensor data, and then drive the second sensor if the vehicle boarding is estimated. The first processor 530 may obtain second sensor data from the second sensor (e.g., the gyro sensor 240B, the E-nose sensor 240N, the microphone 288), and monitor the obtained second sensor data. The first processor 530 may perform an information based vehicle boarding recognition process, by determining whether the second sensor data corresponds to a vehicle boarding condition (e.g., a first vehicle boarding condition). Determining in vehicle or not in vehicle based on the data of the second sensor may have a low confidence level, but the confidence level may be high if determining in vehicle or not in vehicle based on the first sensor data and the second sensor data.

In operation 603, the electronic device 201 (e.g., the first processor 530) may determine whether the sensor data corresponds to the first vehicle boarding condition. The first vehicle boarding condition may be set based on a sensor value detectable by the sensor. For example, the first vehicle boarding condition may include at least one of a vibration pattern, a magnetic change pattern, a position change pattern, an indoor carbon dioxide reference value (or an indoor gas reference value) or an engine sound pattern.

For example, if a change is detected in the sensor data (e.g., the first sensor data or the second sensor data) but a sufficiently great change to determine the vehicle boarding is not detected (e.g., below a first threshold), the first processor 530 may determine no correspondence to the first vehicle boarding condition. Alternatively, if a sufficiently great change to determine the vehicle boarding is detected (e.g., over the first threshold) in the sensor data (e.g., the first sensor data or the second sensor data), the first processor 530 may determine correspondence to the first vehicle boarding condition. If a change is detected in the first sensor data but a sufficiently great change to determine the vehicle boarding is not detected in the second sensor data, the first processor 530 according to various embodiments may determine no correspondence to the first vehicle boarding condition.

The first processor 530 may perform operation 605 if the sensor data corresponds to the first vehicle boarding condition, and may return to operation 601 if the sensor data does not correspond to the first vehicle boarding condition.

In operation 605, the electronic device 201 (e.g., the first processor 530) may extract network information stored in at least one memory (e.g., the at least one memory 550). For example, the first processor 530 may utilize the network information in addition to the sensor data in order to more accurately determine in vehicle or not in vehicle. The network information may include base station information or wireless network information. The base station information may be obtained from the cellular module 221 by the second processor 510. The base station information may include at least one of a base station ID, a base station location, a base station radius, the number of base station uses or the number of available base stations. The base station information may be periodically performed in the electronic device 201 without additional current consumption, and its radius may be wide up to several km.

The second processor 510 according to various embodiments may operate in the sleep state and, if corresponding to at least one of a periodic basis, a set scan period, and an application operation period, wake up and obtain the base station information from the cellular module 221. The second processor 510 may wake up to obtain the base station information, forward the obtained base station information to the first processor 530, and then switch to the sleep state. The first processor 530, which is always active, may store the base station information received from the second processor 510 in the at least one memory 550. Only if corresponding to the first vehicle boarding condition by operation 601 and operation 603, the first processor 530 may extract and utilize the base station information stored in the at least one memory 550 for the vehicle boarding recognition.

The wireless network information may be obtained from the Wifi module 223 by the second processor 510. The wireless network information is related to the WiFi AP, and may include at least one of a WiFi ID, a WiFi name, a WiFi location, WiFi, a signal radius, and a WiFi signal strength. The wireless network information is narrower than the base station information in the radius, and may have an error of tens of m~hundreds of m. The first processor 530 may determine movement or no movement based on an interval and a unique radius for scanning the wireless network information. The first processor 530 may determine whether in vehicle or not in vehicle in a shorter time by use of the wireless network information than the base station information.

The second processor 510 according to various embodiments may operate in the sleep state and, if corresponding to at least one of a periodic basis, a set scan period, and an application operation period, wake up and obtain the wireless network information from the WiFi module 223. The second processor 510 may wake up to obtain the wireless network information, forward the obtained wireless network information to the first processor 530, and then switch to the sleep state. The first processor 530, which is always active, may store the base station information received from the second processor 510 in the at least one memory 550. Only if corresponding to the first vehicle boarding condition by operation 601 and operation 603, the first processor 530 may extract and utilize the wireless network information stored in the at least one memory 550 for the vehicle boarding recognition.

In operation 607, the electronic device 201 (e.g., the first processor 530) may monitor network information. If the base station information continuously changes during a designated time, the first processor 530 may determine that the user boards the vehicle. Yet, if a change of the base station information is detected and the confidence level of the sensor data is high, the first processor 530 may determine in vehicle or not in vehicle without determining the network information. However, if the confidence level of the sensor data is not high and the change of the base station information is unclear, the first processor 530 may determine in vehicle or not in vehicle more clearly by monitoring the wireless network information. However, for doing so, since it is required to continuously monitor the base station information, to accumulate recent data to determine in vehicle or not in vehicle, and to thus determine in vehicle or not in vehicle, continuous network information scanning and changes of recent base station information may be needed for constant uses.

According to various embodiments, the confidence level of the network information (e.g., a network confidence level) may have a higher confidence level than the confidence level of the sensor data (e.g., a sensor confidence level). For example, if the sensor confidence level is low but the network confidence level is high, the first processor 530 may perform operation 617 without performing the following operation 609 through operation 615. Alternatively, if the sensor confidence level is high but the network confidence level is low, the first processor 530 may return to operation 601. Alternatively, if both of the sensor confidence level and the network confidence level are high, the first processor 530 may perform operation 617 without performing the following operation 609 through operation 615.

According to various embodiments, even if both of the sensor confidence level and the network confidence level are high, the first processor 530 may perform the following operation 609 through operation 615 and then finally perform operation 617 to improve accuracy of in vehicle or not in vehicle. This follows an embodiment for implementing the electronic device 201 and is not limited by the following descriptions.

According to various embodiments, the network confidence level and the sensor confidence level may be set to the same confidence level. In this case, the first processor 530 may determine in vehicle or not in vehicle, by giving a different weight to each confidence level. For example, the first processor 530 may assign a higher weight to the network confidence level than the sensor confidence level. If the sensor confidence level is low and the network confidence level is high, the first processor 530 may perform operation 617 without performing the following operation 609 through operation 615. Alternatively, if the sensor confidence level is high but the network confidence level is low, the first processor 530 may return to operation 601. Alternatively, if both of the sensor confidence level and the network confidence level are high, the first processor 530 may perform operation 617 without performing the following operation 609 through operation 615.

In operation 609, the electronic device 201 (e.g., the first processor 530) may determine whether the network information corresponds to a second vehicle boarding condition. The second vehicle boarding condition may include at least one of a communication network change value or a network change value.

For example, if the change of the base station information is detected but a sufficiently great change to determine the vehicle board is not detected (e.g., below a second threshold), the first processor 530 may determine no correspondence to the second vehicle boarding condition. Alternatively, if a change is detected in the wireless network information but a sufficiently great change to determine the vehicle boarding is not detected, the first processor 530 may determine no correspondence to the second vehicle boarding condition. If a change is detected in the base station information but a sufficiently great change to determine the vehicle boarding is not detected in the wireless network information, the first processor 530 according to various embodiments may determine no correspondence to the second vehicle boarding condition.

Alternatively, if the base station information exceeds the communication network change value (e.g., over the second threshold), the first processor 530 may determine correspondence to the second vehicle boarding condition. Alternatively, if the wireless network information exceeds the network change value (e.g., over the second threshold), the first processor 530 may determine correspondence to the second vehicle boarding condition. If the base station information exceeds the communication network change value and the wireless network information falls below the network change value, the first processor 530 may determine correspondence to the second vehicle boarding condition.

The first processor 530 may perform operation 611 if the network information corresponds to the second vehicle boarding condition, and may return to operation 601 if the network information does not correspond to the second vehicle boarding condition.

In operation 611, the electronic device 201 (e.g., the first processor 530) may extract the location information stored in the at least one memory (e.g., the at least one memory 550). The location information may be obtained from the GNSS module 227 by the second processor 510. The second processor 510 according to various embodiments may wake up according to at least one of the periodic basis, the set scan period, and the application operation period and obtain the location information from the GNSS module 227. The second processor 510 may wake up to obtain the location information, forward the obtained location information to the first processor 530, and then switch to the sleep state. The first processor 530, which is always active, may store the location information received from the second processor 510 in the at least one memory 550. Only if corresponding to the second vehicle boarding condition by operation 601 through operation 609, the first processor 530 may extract and utilize the location information stored in the at least one memory 550 for the vehicle boarding recognition.

In operation 613, the electronic device 201 (e.g., the first processor 530) may monitor the location information. If the location information continuously changes during a designated time, the first processor 530 may determine that the user boards the vehicle. If a change of the location information is detected and the confidence levels of the sensor data and the network information are high, the first processor 530 may determine in vehicle or not in vehicle without determining the location information. However, if the confidence levels of the sensor data and the network information are not high and the change of the location information is unclear, the first processor 530 may determine in vehicle or not in vehicle more clearly by monitoring the location information.

According to various embodiments, the confidence level of the location information (e.g., a location confidence level) may be higher than the network confidence level and the sensor confidence level. The first processor 530 according to various embodiments may determine the confidence level based on the location information. For example, if the determined confidence level is a high confidence level enough to determine the vehicle boarding, the first processor 530 may perform operation 617 without performing operation 615. For example, if the confidence level indicates with digits from 1 to 5 and the location confidence level is 5, the first processor 530 may determine that the user boards the vehicle. According to various embodiments, even if all the sensor confidence level, the network confidence level or the location confidence level are high, the first processor 530 may perform the following operation 615 and then finally perform operation 617 to improve accuracy of in vehicle or not in vehicle. This follows an embodiment for implementing the electronic device 201 and is not limited by the following descriptions.

According to various embodiments, the location confidence level may be set to the same confidence level as the network confidence level or the sensor confidence level. In this case, the first processor 530 may determine in vehicle or not in vehicle, by giving a different weight to each confidence level. For example, the first processor 530 may assign a higher weight to the location confidence level than the network confidence level or the sensor confidence level. If the location confidence level is high and the sensor confidence level and the network confidence level are low, the first processor 530 may perform operation 617 without performing the following operation 615. Alternatively, if the location confidence level is low and the sensor confidence level and the network confidence level are high, the first processor 530 may return to operation 601. Alternatively, if all the location information, the network confidence level or the sensor confidence level are high, the first processor 530 may perform operation 617 without performing the following operation 615.

In operation 615, the electronic device 201 (e.g., the first processor 530) may determine whether it corresponds to a third vehicle boarding condition. The third vehicle boarding condition may set based on the location information. The third vehicle boarding condition may be location change information. For example, if a change is detected in the location information but a sufficiently great change to determine in vehicle is not detected (e.g., below a third threshold), the first processor 530 may determine no correspondence to the third vehicle boarding condition. Alternatively, if the location information is the same as or similar to the location change information (e.g., over the third threshold), the first processor 530 may determine correspondence to the third vehicle boarding condition.

The first processor 530 may perform operation 617 if the location information corresponds to the third vehicle boarding condition, and may return to operation 601 if the location information does not correspond to the third vehicle boarding condition.

In operation 617, the electronic device 201 (e.g., the first processor 530) may recognize the vehicle boarding. If determining in vehicle based on all of the sensor data, the network information, and the location information, the first processor 530 may recognize that the user boards the vehicle. The first processor 530 according to various embodiments may provide a service according to the vehicle boarding. The first processor 530 may wake up the second processor 510 to provide the service according to the vehicle boarding, and provide the service according to the vehicle boarding by the second processor 510. Alternatively, the first processor 530 may directly provide the service according to the vehicle boarding without waking up the processor 510.

For example, the first processor 530 may change a mode of the electronic device 201. The first processor 530 may change the mode of the electronic device 201 to a car mode. In the car mode, the first processor 530 may support voice to facilitate manipulation during the driving, or magnify information (e.g., time, date, an icon associated with an application) displayed on the display 260. Alternatively, in the car mode, the first processor 530 may switch a ring tone of the electronic device 201 to vibrations or mute, or limit video play (e.g., DMB).

The first processor 530 according to various embodiments may collect logging information according to the vehicle boarding, and control a user life pattern service based on the collected logging information. In addition, the first processor 530 may correct information according to the vehicle boarding. For example, the acceleration sensor may determine a position change (e.g., landscape or portrait) of the electronic device, a user's position change (e.g., lying, sitting, standing, etc.), and movement (e.g., halt, walk, run, etc.). The first processor 530 may provide various health services (e.g., a pedometer) based on the sensor data of the acceleration sensor. The pedometer may calculate a step period per hour and provide the number of steps, a running time, a running distance, and so on. Yet, the steps may be counted even though the user does not walk or run during the vehicle boarding. The first processor 530 may calibrate the steps by a value misrecognized (or counted wrong) during a vehicle boarding time in the information collected in the vehicle boarding. Alternatively, the first processor 530 may not count the steps during the vehicle boarding.

The first processor 530 according to various embodiments may determine the vehicle boarding condition in a different order based on a priority. For example, while operation 601 and operation 603 may precede operation 605 through operation 609 or operation 611 through operation 615, operation 605 through operation 609 or operation 611 through operation 615 may be performed first and then operation 601 and operation 603 may be performed. Alternatively, after operation 605 and operation 609 are performed, operation 601 and operation 603 or operation 611 through operation 615 may be performed. Alternatively, after operation 611 through operation 615 are performed, operation 601 and operation 603 or operation 605 through operation 609 may be performed.

If the network information or the location information is not stored in the at least one memory 550, the first processor 530 according to various embodiments may request the network information or the location information from the second processor 510. For example, the WiFi module 223 or the GNSS module 227 may be inactive (e.g., not operate) according to user's setting. In this case, the second processor 510 may not acquire the network information or the location information. In this case, the second processor 510 may display (e.g., in a popup form) a guide message which demands the network information or the location information to the user for the vehicle boarding recognition. If the user approves information acquisition based on the guide message, the second processor 510 may acquire the network information or the location information, and forward the acquired network information or the location information to the first processor 530.

The first processor 530 according to various embodiments may determine the confidence level based on the sensor data (e.g., the first sensor data or the second sensor data). For example, if the determined confidence level is high enough to determine the vehicle boarding, the first processor 530 may perform operation 617 without performing the following operation 603 through operation 615. For example, if the confidence level indicates with digits from 1 to 5 and the confidence level is 5 (e.g., the confidence level is high), the first processor 530 may perform operation 617 without performing the following operation 603 through operation 615.

For the highest confidence level based on the first sensor confidence level, the first processor 530 according to various embodiments may determine whether to perform operation 603 through operation 615 based on the second sensor confidence level. For example, if the first sensor confidence level is a high confidence level and the second sensor confidence level is a low confidence level, the first processor 530 may perform operation 603 through operation 615. Alternatively, if both of the first sensor confidence level and the second sensor confidence level are high confidence levels, the first processor 530 may perform operation 617, without performing operation 603 through operation 615.

According to various embodiments, even if the determined confidence level (e.g., the first sensor confidence level or the second sensor confidence level) is high enough to determine the vehicle boarding, the first processor 530 may perform operation 603 through operation 615 and then finally perform operation 617, to improve accuracy of in vehicle or not in vehicle. This follows an embodiment for implementing the electronic device 201 and is not limited by the following descriptions.

If determining in vehicle or not in vehicle using sensing data detected by the sensor module 540, the first processor 530 according to various embodiments may determine in vehicle or not in vehicle more accurately using the communication information stored in the at least one memory 550. Alternatively, if the communication information is not stored in the at least one memory 550, the first processor 530 may determine in vehicle or not in vehicle using only the sensing data acquired by the sensor module 540.

Figure 7:
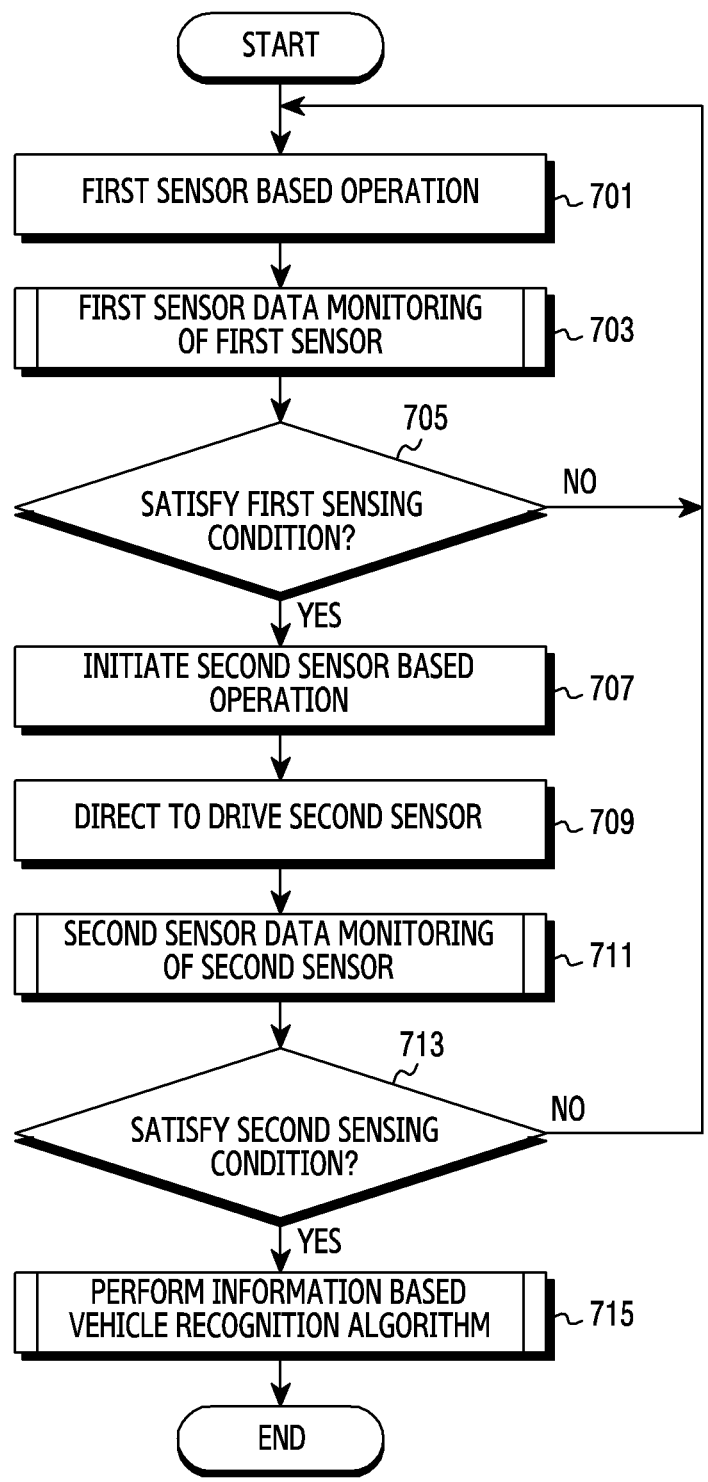
FIG. 7 is a flowchart illustrating a sensor based vehicle boarding recognition method according to various embodiments.

FIG. 7 is a flowchart illustrating a sensor based vehicle boarding recognition method according to various embodiments.

Referring to FIG. 7, in operation 701, the electronic device 201 (e.g., the first processor 530) may operate based on a first sensor. The first sensor based operation may acquire sensor data regarding the vehicle boarding based on a sensor which is configured to operate 24 hours. For example, the first processor 530 may control a geomagnetic sensor (e.g., the geomagnetic sensor 240L) or an acceleration sensor (e.g., the acceleration sensor 240E) based on the first sensor. The first sensor based operation may be the sleep mode state of the second processor 510. For example, the first processor 530 of the electronic device 201 may control the first sensor based operation.

The vehicle according to various embodiments may include a vehicle using an internal combustion engine, a vehicle (e.g., an electric car) which runs using a motor by electricity, and a hybrid car including both of an internal combustion engine and a motor. Accordingly, since the vehicle varies in type, the first processor 530 may determine in vehicle or not in vehicle by firstly driving all of the acceleration sensor and the geomagnetic sensor. Basically, it is the best case to determine the vehicle recognition upon getting on the vehicle but a separate identification device must be mounted for doing so. Yet, if the user drives his/her own car, the primary determination may be possible with a pattern after the vehicle starts (e.g., vehicle stationary state). For example, if the user gets into a vehicle using an internal combustion engine and starts the vehicle, the first processor 530 may primarily determine in vehicle or not in vehicle, by comparing a vibration pattern detected using the acceleration sensor with a vehicle vibration pattern.

For example, the electric vehicle has no engine unlike the vehicle which uses the internal combustion engine and includes an electric motor. That is, a conventional scheme which starts the vehicle and recognizes the vehicle boarding based on characteristics of the engine may not satisfy an automatic recognition condition if boarding the electric vehicle. The first processor 530 according to various embodiments may recognize whether the user boards the electric vehicle by utilizing additional information. Since the electric car installs the electric motor at a wheel, the boarding may be recognized by detecting a strong magnetic force generating at the motor during the driving by use of the geomagnetic sensor. The automatic recognition is possible because the geomagnetic sensor outputs have a specified pattern according to the strong magnetic forces of the motor.

According to an embodiment of the present invention, by using the geomagnetic sensor and the acceleration sensor as the first sensor, it is possible to efficiently recognize boarding or no boarding for the vehicle of various types.

In operation 703, the electronic device 201 (e.g., the first processor 530) may monitor the first sensing data of the first sensor. Current consumption of the sensors may be several uA, and may be measured based on tens of ms. The first processor 530 may monitor each sensor, and thus generate an event based on a pattern observed for a specific state or a particular time. For example, the first processor 530 may monitor a vibration pattern transmitted to the electronic device 201 using acceleration information obtained from an acceleration sensor (e.g., the acceleration sensor 240E). The first processor 530 may monitor a magnetic change pattern of the electronic device 201 using geomagnetic information obtained from a geomagnetic sensor (e.g., the geomagnetic sensor 240L).

In operation 705, the electronic device 201 (e.g., the first processor 530) may determine whether the first sensing data satisfies a first sensor condition (or a first sensing condition). The first sensor condition may be a vehicle vibration pattern or a vehicle magnetic change pattern. The vibration detected by the acceleration sensor may have a repetitive pattern, and the vehicle vibration pattern may be determined according to whether the pattern continues. For example, the first processor 530 may determine that the vibration pattern satisfies the first sensor condition if the vibration pattern monitored by the acceleration sensor is the same as or similar to the vehicle vibration pattern. The magnetic sensor has a size change of the magnetic field over a specific size during a short time, and whether it is caused by the electric motor may be determined based on the duration and the pattern. For example, if the magnetic pattern monitored by the geomagnetic sensor is the same as or similar to the vehicle vibration pattern, the first processor 530 may determine that the magnetic pattern satisfies the first sensor condition.

The first processor 530 may perform operation 707 if satisfying the first sensor condition, and may return to operation 701 if not satisfying the first sensor condition.

In operation 707, the electronic device 201 (e.g., the first processor 530) may initiate a second sensor based operation. For example, the second sensor may not operate for 24 hours unlike the first sensor. Also, current consumption of the second sensor may be the same as the current consumption of the first sensor or higher than the current consumption of the first sensor. The second sensor based operation may be triggered by the first sensor based operation. That is, if it is uncertain to determine the in vehicle state by the first sensor or if the first sensor data and the second sensor data are combined, the first processor 530 may initiate the second sensor based operation to determine the state more accurately.

In operation 709, the electronic device 201 (e.g., the first processor 530) may direct (or control) to drive the second sensor. The second sensor may include at least one of a gyro sensor (e.g., the gyro sensor 240B), an E-nose sensor (e.g., the E-nose sensor 240N), and a sound sensor (e.g., the microphone 288).

In operation 711, the electronic device 201 (e.g., the first processor 530) may monitor second sensing data of the second sensor. The first processor 530 may monitor a position change using rotation information obtained from the gyro sensor. If the user is driving a vehicle, a position change pattern in the driving may be detected by the gyro sensor. Alternatively, if the user is sitting in a vehicle, the sitting position change pattern may be detected by the gyro sensor. The first processor 530 may monitor carbon dioxide concentration using olfactory information acquired from the E-nose sensor. The first processor 530 may monitor a sound pattern (e.g., engine sound) using sound information obtained from the sound sensor.

A vehicle of an internal combustion engine generates the engine sound, but the electric car may generate artificial engine sound. If determining whether it is the electric vehicle or not merely using the geomagnetic sensor, accuracy may decline. Thus, if detecting the vehicle magnetic change pattern by the geomagnetic sensor, the first processor 530 may efficiently recognize whether the user boards the electric vehicle by identifying the engine sound using the sound sensor as the second sensor. In addition, by detecting a carbon dioxide concentration change using the E-nose sensor, the first processor 530 may secondarily determine in vehicle or not in vehicle based on the carbon dioxide concentration change. The first processor 530 may determine in vehicle or not in vehicle based on the acceleration information and the position change information of the gyro sensor together with a user's motion which moves a steering wheel at a driver's seat while the vehicle is running. Alternatively, as fast movement is possible during the vehicle driving, the movement may affect outputs of the acceleration sensor according to a road condition. By detecting a particular vibration pattern by the acceleration sensor, the first processor 530 may detect that the vehicle is running.

In operation 713, the electronic device 201 (e.g., the first processor 530) may determine whether the second sensing data satisfies a second sensor condition (or a second sensing condition). The first sensor condition and the second sensor condition may be included in the first vehicle boarding condition. The second sensor condition may include at least one of a position change pattern, a carbon dioxide indoor reference value or the engine sound pattern. If the user is driving a vehicle, the position change pattern may be detected in the driving. Alternatively, if the user is sitting in the vehicle, the sitting position change pattern may be detected. If the monitored position change is the same as or similar to the position change pattern of the driving or the sitting state, the first processor 530 may determine that it satisfies the second sensor condition. If determining that the sound pattern is similar to engine sound characteristics, the first processor 530 may determine that it satisfies the second sensor condition. If the carbon dioxide concentration corresponds to the indoor reference value, the first processor 530 may determine that it satisfies the second sensor condition.

The first processor 530 according to various embodiments may recognize which kind of the vehicle it is based on the type of the sensor. For example, for a vehicle of an internal combustion engine, the vibration pattern may be detected by the acceleration sensor rather than the magnetic change pattern detected by the geomagnetic sensor. Alternatively, in case of the electric vehicle, the magnetic change pattern may be detected by the geomagnetic sensor rather than the vibration pattern detected by the acceleration sensor. A hybrid vehicle may determine the vehicle type by comparing the vehicle change patterns (e.g., the vehicle vibration pattern, the vehicle magnetic change pattern) when the vehicle is stationary and running. That is, the first processor 530 may determine the sensor for determining in vehicle or not in vehicle based on the vehicle type. The first processor 530 may designate a different confidence level of the sensing data obtained from each sensor based on the vehicle type.

The first processor 530 may return to operation 701 if not satisfying the second sensor condition (or the second sensing condition), and perform operation 715 if satisfying the second sensor condition. If not satisfying the second sensor condition, the first processor 530 according to an embodiment may return to operation 711 and repeat the second sensing data monitoring of the second sensor.

In operation 715, the electronic device 201 (e.g., the first processor 530) may perform an information based vehicle recognition algorithm. The information based vehicle recognition algorithm may include an operation for determining in vehicle or not in vehicle using at least one of base station information, wireless network information, and location information. The information based vehicle recognition algorithm may be the same as or similar to operation 605 through operation 617 described in FIG. 6. The first processor 530 may perform operation 713 and more accurately determine in vehicle or not in vehicle based on information if estimating that the user boards the vehicle. The information based vehicle boarding recognition algorithm will be explained in detail with FIG. 10 and FIG. 11.

Figure 8:
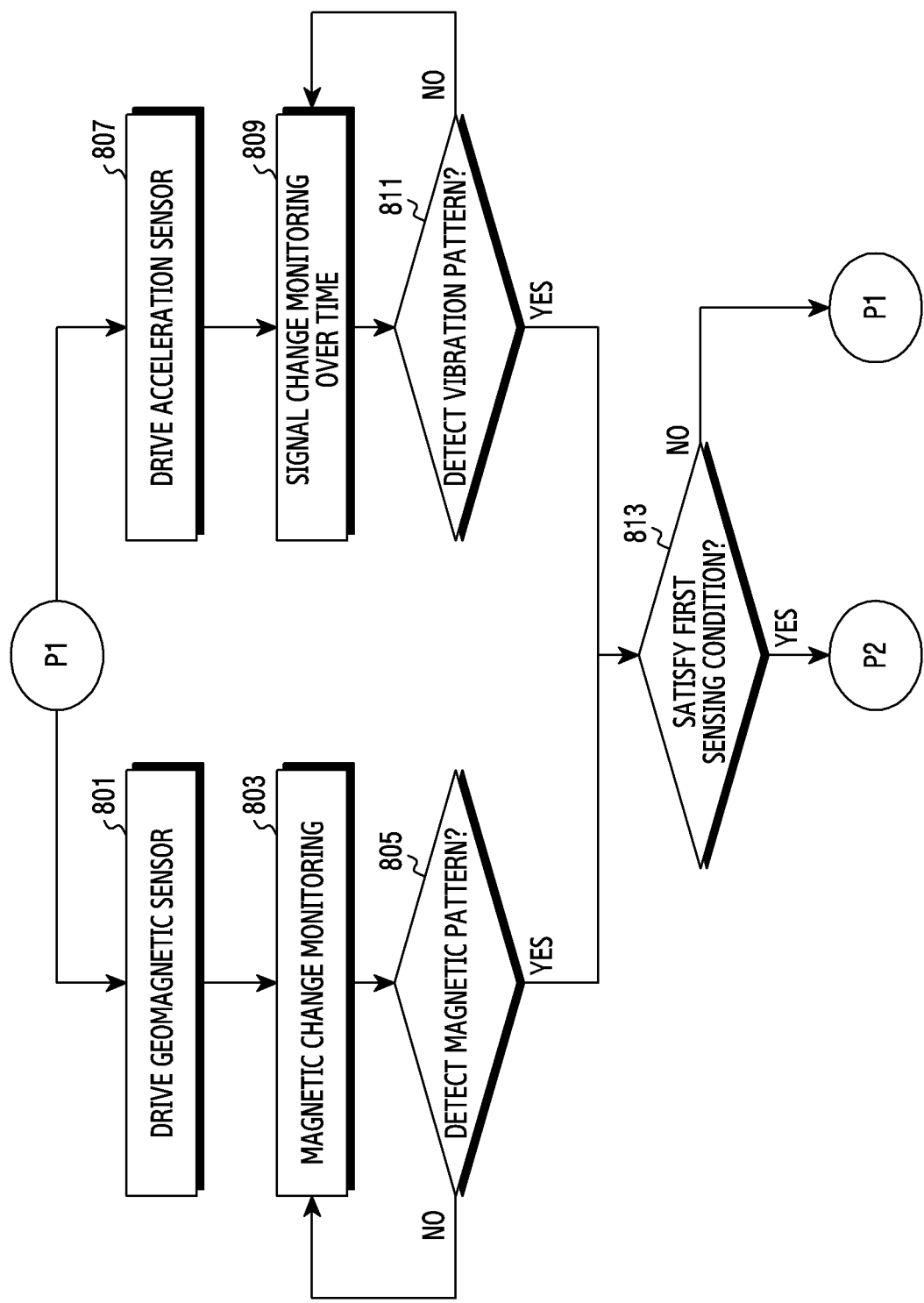
FIG. 8 and FIG. 9 are flowcharts illustrating a vehicle boarding recognition method using different sensors of an electronic device according to various embodiments.
Figure 9:
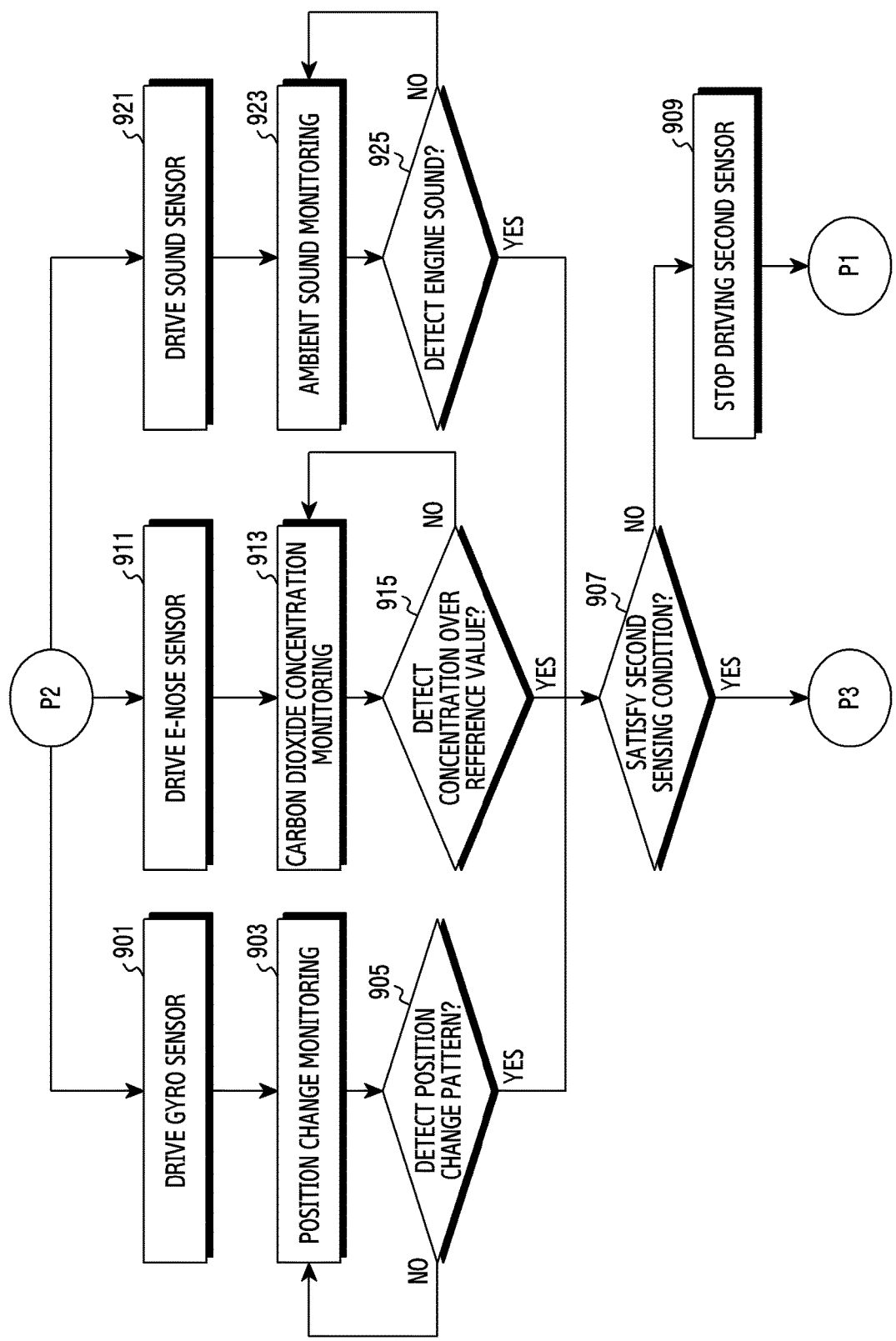

FIG. 8 and FIG. 9 are flowcharts illustrating a vehicle boarding recognition method using different sensors of an electronic device according to various embodiments.

FIG. 8 is a flowchart illustrating a first sensor based vehicle boarding recognition algorithm (e.g., Phase 1).

In FIG. 8 operations, the second processor 510 included in the electronic device 201 according to various embodiments may be in the sleep state. Alternatively, the second processor 510 may wake up to obtain communication information, forward the obtained communication information to the first processor 530, and switch to the sleep state if the transmission of the communication information is finished. The first processor 530 may store the communication information in at least one memory (e.g., the memory 550).

Referring to FIG. 8, in operation 801, the electronic device 201 (e.g., the first processor 530) may drive a geomagnetic sensor. The geomagnetic sensor (e.g., the geomagnetic sensor 240L) may detect a magnetic field change around the electronic device 201. The geomagnetic sensor may operate while the electronic device 201 is turned on without control of the first processor 530.

In operation 803, the electronic device 201 (e.g., the first processor 530) may monitor the magnetic change. For example, the first processor 530 may detect whether there is a magnetic change.

In operation 805, the electronic device 201 (e.g., the first processor 530) may determine whether a magnetic pattern is detected. For example, an electric vehicle installs a motor at a wheel of the electric vehicle, and accordingly a change may occur in the geomagnetic sensor output. Thus, the first processor 530 may perform operation 813 if the magnetic pattern is detected, and perform operation 803 if the magnetic pattern is not detected. If the magnetic pattern is detected, the first processor 530 according to various embodiments may determine a confidence level (e.g., 1~5) for the magnetic pattern. For example, the confidence level may increase as the magnetic pattern is more similar to a vehicle magnetic pattern.

In operation 807, the electronic device 201 (e.g., the first processor 530) may drive an acceleration sensor. The acceleration sensor (e.g., the acceleration sensor 240E) may detect a speed change of the electronic device 201. The acceleration sensor may operate while the electronic device 201 is turned on without the control of the first processor 530.

In operation 809, the electronic device 201 (e.g., the first processor 530) may monitor a signal change based on time. For example, the first processor 530 may detect whether the signal change is considerable over time. For example, if the user is walking, the signal change may not be great. Alternatively, if the user is running or cycling, the signal change may be great compared with the walking. The signal change may be considerable even when the user boards the vehicle.

In operation 811, the electronic device 201 (e.g., the first processor 530) may determine whether a vibration pattern is detected. For example, if the user is on board the vehicle, the speed change may be greater than running or walking. In general, the walking speed is 4 km/h, and the running speed is 25 km/h. The speed of the vehicle boarding may be less than or more than 20 km/h. Hence, the first processor 530 may perform operation 813 if the vibration pattern is detected, and perform operation 809 if the vibration pattern is not detected. If the vibration pattern is detected, the first processor 530 according to various embodiments may determine the confidence level (e.g., 1~5) for the vibration pattern. For example, the confidence level may increase as the vibration pattern is more similar to the vehicle vibration pattern.

In operation 813, the electronic device 201 (e.g., the first processor 530) may determine whether it satisfies a first sensor condition. For example, the first processor 530 analyze magnetic field change characteristics and thus determine whether the magnetic pattern is the same as or similar to a vehicle magnetic change pattern. If the magnetic pattern is the same or similar to the vehicle magnetic change pattern, the first processor 530 may determine that it satisfies the first sensor condition. For another example, the first processor 530 may analyze a vibration pattern and thus determine whether the vibration pattern is the same as or similar to the vibration pattern generating in the vehicle boarding. If the vibration pattern is the same as or similar to the vehicle vibration pattern, the first processor 530 may determine that it satisfies the first sensor condition.

If satisfying the first sensor condition, the first processor 530 may perform operation (e.g., Phase 2) for determining in vehicle or not in vehicle by the second sensor. If not satisfying the first sensor condition, the first processor 530 may return to operation (e.g., operation 801 or operation 807) for determining in vehicle or not in vehicle by the first sensor.

The first processor 530 according to various embodiments may determine an in vehicle state or a not in vehicle state according to whether the first sensor condition is satisfied. Yet, the first processor 530 may determine each confidence level according to the first sensor, or determine a single confidence level based on the detection pattern of the first sensor. Hereinafter, an embodiment where the confidence level is set to digits from 1 to 5 is explained. At this time, the first sensor condition may further include a first sensor reference confidence level (e.g., 3). For example, if the vibration pattern by the acceleration sensor is similar to the vehicle vibration pattern, the first processor 530 may set the sensor confidence level by the acceleration sensor to '3'. If the magnetic pattern by the geomagnetic sensor is similar to the vehicle magnetic change pattern, the first processor 530 may set the sensor confidence level by the geomagnetic sensor to '4'. In this case, the first sensor reference confidence level may be a summed value or an average value of the confidence level of the acceleration sensor and the confidence level of the geomagnetic sensor. Alternatively, the first processor 530 may determine a representative confidence level of the first sensor by combining the confidence levels of the first sensors. The first processor 530 may determine the in vehicle state or the not in vehicle state according to whether the representative confidence level of the first sensor exceeds the first sensor reference confidence level.

If the vibration pattern is detected by the acceleration sensor but the magnetic change pattern is not detected by the geomagnetic sensor, the first processor 530 according to various embodiments may determine the confidence level (the first sensor confidence level) to '3'. Alternatively, if the vibration pattern is not detected by the acceleration sensor and the magnetic change pattern is detected by the geomagnetic sensor, the first processor 530 may determine the confidence level (the first sensor confidence level) to '4'. If the vibration pattern is detected by the acceleration sensor but the magnetic change pattern is detected by the geomagnetic sensor, the first processor 530 may determine the confidence level (the first sensor confidence level) to '5'. If the first sensor reference confidence level exceeds 3, the first processor 530 may determine that it satisfies the first sensor condition. The first sensor reference confidence level may be set by the user or set by default in the electronic device 201. For example, the first sensor reference confidence level may be 4 or 5 or more.

If the vibration pattern is detected by the acceleration sensor but is not similar to the vehicle vibration pattern, the first processor 530 may determine the confidence level (the first sensor confidence level) to '1' or '2'. If the magnetic pattern is detected by the geomagnetic sensor but is not similar to the vehicle magnetic change pattern, the first processor 530 may determine the confidence level (the first sensor confidence level) to '1' or '2'.

The first processor 530 according to various embodiments may not definitely determine the state where the confidence level is not '5' as the in vehicle state. Alternatively, as the confidence level is high, the first processor 530 may rapidly determine the in vehicle state rapidly with less information. Yet, if the confidence level is '4' or 1', the not in vehicle state may be estimated. If the pattern is detected by the acceleration sensor or the geomagnetic sensor even in the not in vehicle state, a walking or running event may occur. In this case, if the confidence level is 1', the first processor 530 may determine it as the not in vehicle state. Alternatively, if the confidence level is '4', the first processor 530 may perform operation 707 through operation 715, without determining the not in vehicle state, and thus determine the in vehicle state or the not in vehicle state more accurately. That is, a monitoring time difference for the state transition may be determined by the confidence level.

Operation 801 through operation 805 may be performed concurrently with operation 807 through operation 811, or may be performed before operation 807 through operation 811 or after operation 807 through operation 811. This is merely an embodiment to ease the understanding of the invention, and is not to limit the configuration of the present invention.

FIG. 9 is a flowchart illustrating a second sensor based vehicle boarding recognition algorithm (e.g., Phase 2) according to an embodiment.

The vehicle boarding recognition process (P2) by the second sensor according to an embodiment may be operated by a triggering event of the first sensor based vehicle boarding recognition process (P1). A state measured by the sensors used in P2 has uncertainty in determining the state of the vehicle, but may help to determine a more accurate situation in combination with P1. That is, the vehicle boarding state determination by the individual operation of P2 or P1 may be inaccurate, but the combinational determination of P1 and P2 may more accurately determine whether the user boards the vehicle. In general, current consumption of the second sensor may be greater than current consumption of the first sensor, but may be the same or smaller.

In FIG. 9 operations, the second processor 510 included in the electronic device 201 according to various embodiments may be in the sleep state. Alternatively, the second processor 510 may wake up to obtain communication information, forward the obtained communication information to the first processor 530, and switch to the sleep state if the transmission of the communication information is finished. The first processor 530 may store the communication information in at least one memory (e.g., the memory 550).

Referring to FIG. 9, in operation 901, the electronic device 201 (e.g., the first processor 530) may drive a gyro sensor. The gyro sensor (e.g., the gyro sensor 240B) may not operate all the time. The first processor 530 may drive the gyro sensor to determine in vehicle state more accurately.

In operation 903, the electronic device 201 (e.g., the first processor 530) may monitor a position change. The first processor 530 may monitor the position change by using rotation information obtained from the gyro sensor. For example, the first processor 530 may recognize whether the vehicle goes uphill or downhill using the position change. Alternatively, the first processor 530 may recognize driving, turn information, and so on using the position change. The first processor 530 may determine (or estimate) the in vehicle state if the position change frequently occurs within a specific range.

In operation 905, the electronic device 201 (e.g., the first processor 530) may determine whether the position change pattern is detected. The position change pattern may include at least one of driving or not, sifting or not, the turn information, the rotation information, uphill driving, and downhill driving. The first processor 530 may perform operation 907 if the position change pattern is detected, and perform operation 903 if the position change pattern is not detected. If the position change pattern is detected, the first processor 530 according to various embodiments may determine a confidence level (e.g., 1~5) for the position change. For example, the higher similarity of the position change pattern with the vehicle position change pattern (e.g., the turn information, the rotation information, the uphill driving or the downhill driving), the higher confidence level.

In operation 911, the electronic device 201 (e.g., the first processor 530) may drive an E-nose sensor. The E-nose sensor (e.g., the E-nose sensor 240N) may not drive all the time. The first processor 530 may drive the E-nose sensor to determine the in vehicle state more accurately. The E-nose sensor may be a gas sensor or an environment sensor. The gas sensor may detect gas, or measure gas concentration.

In operation 913, the electronic device 201 (e.g., the first processor 530) may monitor carbon dioxide concentration. The first processor 530 may determine the indoor or the outdoor using the concentration of the carbon dioxide. If the carbon dioxide concentration is determined as the indoor, and the vibration pattern by the acceleration sensor is the vehicle vibration pattern, the first processor 530 may determine a moving indoor space. In addition, the first processor 530 may measure not only the carbon dioxide concentration but also various gases by means of the E-nose sensor.

In operation 915, the electronic device 201 (e.g., the first processor 530) may determine whether the carbon dioxide concentration is detected over a reference value. For example, the first processor 530 may determine the indoor if the carbon dioxide concentration over the reference value is detected. The first processor 530 may perform operation 907 if detecting the carbon dioxide over the reference value, and perform operation 913 if not detecting the carbon dioxide over the reference value. If detecting the carbon dioxide (or gas) concentration over the reference value, the first processor 530 according to various embodiments may determine a confidence level (e.g., 1~5) for the carbon dioxide concentration. For example, the higher carbon dioxide concentration, the higher confidence level.

In operation 921, the electronic device 201 (e.g., the first processor 530) may drive a sound sensor. The sound sensor (e.g., the microphone 288) may not drive all the time. The first processor 530 may drive the sound sensor in order to determine the in vehicle state more accurately.

In operation 923, the electronic device 201 (e.g., the first processor 530) may monitor an ambient sound. The first processor 530 may measure a noise level using the sound sensor. For example, the first processor 530 may distinguish a specific sound through sound wave analysis. The sound sensor may have a considerable disadvantage of great effect on noise, but may distinguish it based on a different frequency band and distinguish the specific sound if it is loud.

In operation 925, the electronic device 201 (e.g., the first processor 530) may determine whether engine sound is detected. For example, the engine sound may have characteristics of a low frequency band, and may be repeated in many cases. In addition, since sound attenuation based on a distance is considerable, affect of other vehicle sound may not be great. Further, in vehicle or not in vehicle may be determined more accurately by combining sensing data of the sound data and sensing data of an acceleration sensor or a geomagnetic sensor. The first processor 530 may determine whether the sensing data measured by the sound sensor is the same as or similar to the engine sound. The first processor 530 may perform operation 907 if the engine sound is detected, and perform operation 923 if the engine sound is not detected. If detecting the engine sound, the first processor 530 according to various embodiments may determine the confidence level (e.g., 1~5) for the engine sound. For example, the higher similarly of the engine sound with the vehicle engine sound, the higher confidence level.

In operation 907, the electronic device 201 (e.g., the first processor 530) may determine whether it satisfies a second sensor condition. For example, the second sensor condition may include at least one of the position change pattern, the indoor carbon dioxide reference value (or the indoor gas reference value) or the engine sound pattern. The first processor 530 according to various embodiments may perform a communication information based vehicle boarding recognition process (Phase 3) if the sensing data of at least one, two, or all of the gyro sensor, the E-nose sensor or the sound sensor satisfies the second sensor condition.

The first processor 530 according to various embodiments may determine the second sensor condition based on the confidence level of the first sensor based vehicle boarding recognition process (P1). For example, if the confidence level of the first sensor based vehicle board recognition process (P1) is high (e.g., over '4'), a threshold of the second sensor condition may be lowered or a monitoring duration of the second sensor may be reduced. Alternatively, if the confidence level of the first sensor based vehicle boarding recognition process (P1) is low (e.g., below '3'), the threshold of the second sensor condition may be raised or the monitoring duration of the second sensor may be increased.

The first processor 530 according to various embodiments may determine the in vehicle state or the not in vehicle state according to whether it satisfies the second sensor condition. The second sensor condition may further include a second sensor reference confidence level (e.g., '3'). The first processor 530 may determine each confidence level according to the second sensor, or determine a single confidence level based on the detection pattern of the second sensor. If the confidence level is determined for each second sensor, the second sensor reference confidence level may be a summed value or an average value of the confidence levels of the second sensors. Alternatively, the first processor 530 may determined a representative confidence level of the second sensor by synthesizing the confidence levels of the second sensors. The first processor 530 may determine the in vehicle state or the not in vehicle state according to whether the representative confidence level of the second sensor exceeds the second sensor reference confidence level.

The first processor 530 according to various embodiments may perform the information based vehicle boarding recognition process (P3, P4) according to whether it satisfies the second sensor condition. The first processor 530 may perform operation 909 if not satisfying the second sensor condition. Alternatively, if the confidence level for the second sensor based vehicle boarding recognition process (P2) is high (e.g., '5'), the first processor 530 may determine the in vehicle state without conducting the information based vehicle boarding recognition process (P3, P4).

In operation 909, the electronic device 201 (e.g., the first processor 530) may stop driving the second sensor. For example, if not satisfying the second sensor condition, the first processor 530 may stop driving the second sensor. The second sensor operates if it is difficult to determine the in vehicle state merely with the first sensor, which may require higher current consumption than the first sensor. Hence, the first processor 530 may control the second sensor not to drive any more before returning to the first sensor based vehicle boarding recognition process (P1). The first processor 530 may stop driving the second sensor, and return to the first sensor based vehicle boarding recognition process (P1).

Operation 901 through operation 905 may be performed concurrently with operation 911 through operation 915 or operation 921 through operation 923, before operation 911 through operation 915 or operation 921 through operation 923, or after operation 911 through operation 915 or operation 921 through operation 923. This is merely an embodiment to ease the understanding of the invention, and is not to limit the configuration of the present invention.

The information based vehicle boarding recognition processes (Phase 3, Phase 4) may be performed by event triggering of the second sensor based vehicle boarding recognition process (P2). For example, if the first sensor based vehicle boarding recognition process (P1) and the second sensor based vehicle boarding recognition process (P2) feature environmental state measurement by sensing surroundings, the information based vehicle boarding recognition processes (P3, P4) may measure mobility. The first sensor based vehicle boarding recognition process (P1) and the second sensor based vehicle boarding recognition process (P2) according to various embodiments may determine whether the user boards the vehicle in the stationary state, and the information based vehicle boarding recognition processes (P3, P4) may determine whether the user boards the vehicle in the mobile state.

Figure 10:
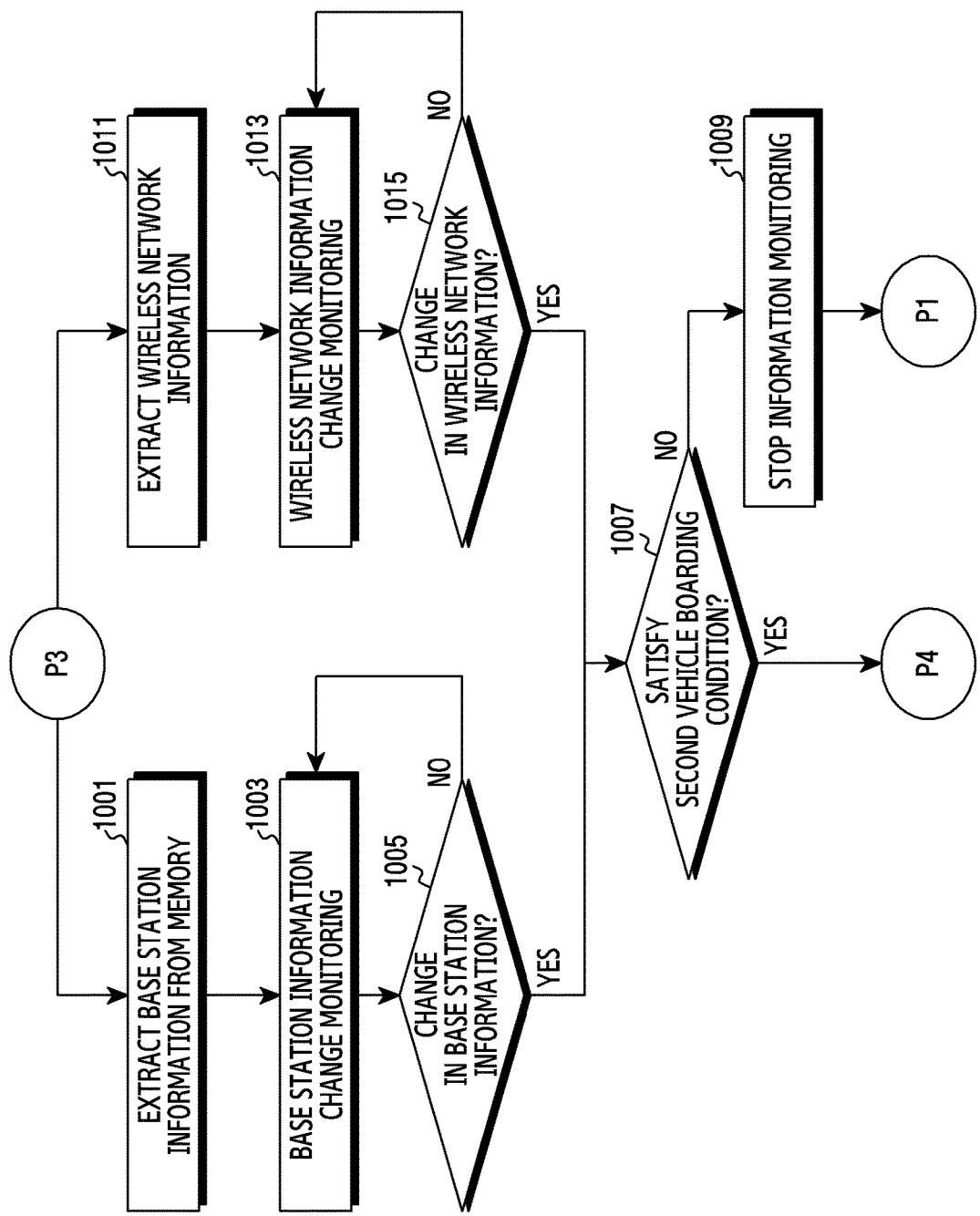
FIG. 10 is a flowchart illustrating a network information based vehicle boarding recognition method according to various embodiments.

FIG. 10 is a flowchart illustrating a network information based vehicle boarding recognition method according to various embodiments.

The electronic device 201, which is always connected via a network, may identify whether the user moves by utilizing connected network information (e.g., base station and neighboring network information (e.g., WiFi AP)). However, to identify whether the user is moving on the vehicle, change information management based on time may be conducted on not only the network information but also the base station information connected to the electronic device 201, a change model based on the movement may be generated with MAC address and signal strength change of the network information, and the movement or the vehicle boarding may be determined using them.

According to an embodiment, determining the movement through the network information may be performed based on the confident level of the sensor based vehicle boarding recognition process (e.g., P1 or P2). For example, only if the vehicle boarding is estimated by the sensor based vehicle boarding recognition process (e.g., P1 or P2), the movement or not may be determined using the network information based vehicle boarding recognition process (P3). The movement or not may include linearity in some degree, not merely with the network changes. If the confidence level of the sensor based vehicle boarding recognition process (e.g., P1 or P2) is high (e.g., over the confidence level 4), the first processor 530 may detect a small number of network changes or determine the in vehicle state merely with the change of the base station information. If the confidence level of the sensor based vehicle boarding recognition process (e.g., P1 or P2) is not high (e.g., below the confidence level 3), the first processor 530 may detect a great number of network changes and determine the in vehicle state by detecting all the changes of the base station information and the network information.

In FIG. 10 operations, the second processor 510 included in the electronic device 201 according to various embodiments may be in the sleep state. Alternatively, the second processor 510 may wake up to obtain communication information (e.g., at least one of the base station information, the wireless network information or the location information), forward the obtained communication information to the first processor 530, and if the transmission of the communication information is finished, switch to the sleep state. The first processor 530 may store the communication information in at least one memory (e.g., the memory 550). Alternatively, if receiving an information request from the first processor 530, the second processor 510 may wake up and display (e.g., in a popup form) a guide message indicating that the communication information is needed for the vehicle boarding recognition. If the user approves information acquisition according to the information message, the second processor 510 may obtain the communication information and forward the obtained communication information to the first processor 530.

Referring to FIG. 10, in operation 1001, the electronic device 201 (e.g., the first processor 530) may extract (or load) the base station information from at least one memory (e.g., the memory 550). The base station information may be obtained from the cellular module 221 by the second processor 510. The base station information may include at least one of a base station ID, a base station location, a base station radius, the number of base station uses, or the number of available base stations.

In operation 1003, the electronic device 201 (e.g., the first processor 530) may monitor a change of the base station information. For example, the first processor 530 may determine movement or not based on the base station information which changes over time.

In operation 1005, the electronic device 201 (e.g., the first processor 530) may determine whether the base station information has a change. The first processor 530 may calculate a movement speed based on the base station information change. For example, the first processor 530 may determine that the user boards a vehicle if the base station information change is detected with the speed change enough to determine in vehicle. The first processor 530 may perform operation 1007 if there is a change in the base station information, and may perform operation 1003 if there is no change in the base station information. The first processor 530 according to various embodiments may determine the confidence level (e.g., 1~5) for the base station if detecting the change in the base station information. For example, the greater base station change, the higher confidence level.

For example, the speed at which a person may run may be 25 km/h or so. However, since running may be detected first by the acceleration sensor, the running state detection may be detected in P1 and P2. Hence, since the network information change in the simple running may not be great, the first processor 530 may increase accuracy of the in vehicle state by further determining whether the network information changes for shortage of the determination merely with P1 and P2. The in vehicle state may be determined with a reasonable determination method based on the movement speed of 20 km/h or so. If the confidence level of P1 or P2 is high, the first processor 530 according to various embodiments may determine the in vehicle state even though the movement speed is below 20 km/h.

A bicycle has a higher movement speed than the running, but P1 or P2 may be highly likely to determine as the bicycle riding state. Because a vibration pattern of the bicycle is different from the vibration pattern of the vehicle, it may not satisfy the first sensor condition in operation 813 of FIG. 8. In addition, the bicycle riding may not significantly affect the geomagnetic sensor, and accordingly may not satisfy the first sensor condition in operation 813 of FIG. 8. Alternatively, the first processor 530 may lower the confidence level of the P1 or P2 in case of the bicycle riding.

In operation 1011, the electronic device 201 (e.g., the first processor 530) may extract (or load) wireless network information from the at least one memory 550. The wireless network information may be obtained from the WiFi module 223 by the second processor 510. The wireless network information is related to a WiFi AP, and may include at least one of a WiFi ID, a WiFi name, a WiFi location, WiFi, a signal radius, or a WiFi signal strength.

In operation 1013, the electronic device 201 (e.g., the first processor 530) may monitor a change of the wireless network information. For example, the first processor 530 may determine movement or not based on the wireless network information which changes over time. For example, the first processor 530 may determine the movement or not based on an interval and a unique radius for scanning the wireless network information.

In operation 1015, the electronic device 201 (e.g., the first processor 530) may determine whether there is a change in the wireless network information. The first processor 530 may determine in vehicle or not in vehicle within a shorter time by use of the wireless network information than the base station information. The first processor 530 may determine the movement state if a value of the wireless network information change per hour is great. In the movement state determination as described above, the first processor 530 may calculate a movement speed of the vehicle boarding which is distinguished from the running state or the bicycle riding state based on the change of the wireless network information. The first processor 530 may perform operation 1007 if there is a change in the wireless network information, and perform operation 1013 if there is no change in the wireless network information. If detecting the change in the wireless network information, the first processor 530 according to various embodiments may determine a confidence level (e.g., 1~5) for the network. For example, the greater change of the wireless network information, the higher confidence level. Alternatively, the confidence level of the network may be higher than the confidence level of the base station.

In operation 1007, the electronic device 201 (e.g., the first processor 530) may determine whether it satisfies a second vehicle boarding condition. The second vehicle boarding condition may include at least one of a communication network change value or a network change value. The first processor 530 may determine whether the change of the base station information is greater than the communication network change value. The first processor 530 may determine whether the change of the wireless network information is greater than the network change value. If the change of the base station information exceeds the communication network change value, or if the change of the wireless network information exceeds the network change value, the first processor 530 may determine that it satisfies the second vehicle boarding condition.

The first processor 530 according to various embodiments may determine the second vehicle boarding condition based on the confidence level of the sensor based vehicle boarding recognition processes (P1, P2). For example, if the confidence level of the sensor based vehicle boarding recognition processes (P1, P2) is high (e.g., over '4'), a threshold (e.g., the communication network change value or the network change value) of the second vehicle boarding condition may be lowered, the monitoring duration of the wireless network information may be reduced, or only the change of the base station information may be detected. Alternatively, if the confidence level of the sensor based vehicle boarding recognition processes (P1, P2) is low (e.g., below '3'), the threshold of the second vehicle boarding condition may be raised, the monitoring duration of the wireless network information may be increased, or the changes of both of the base station information and the wireless network information may be detected.

The first processor 530 according to various embodiments may determine the in vehicle state or the not in vehicle state according to whether it satisfies the second vehicle boarding condition. The second vehicle boarding condition may further include a second reference confidence level (e.g., 3). The first processor 530 may determine the respective confidence levels according to the information (e.g., the base station information, the wireless network information), or may determine a single confidence level based on the information change. If the confidence level is determined for the respective information, the second reference confidence level may be a summed value or an average value of the confidence levels of the information. Alternatively, the first processor 530 may determine an information representative confidence level by synthesizing the confidence levels of the information. The first processor 530 may determine the in vehicle state or the not in vehicle state according to whether the information representative confidence level exceeds the second reference confidence level.

The first processor 530 according to various embodiments may perform a location information based vehicle boarding recognition process (P4) according to whether it satisfies the second vehicle boarding condition. If not satisfying the second vehicle boarding condition, the first processor 530 may perform operation 1009. Alternatively, if the confidence level for the information based vehicle boarding recognition process (P3) is high (e.g., 5), the first processor 530 may determine the in vehicle state without performing the location information based vehicle boarding recognition process (P4).

In operation 1009, the electronic device 201 (e.g., the first processor 530) may stop monitoring the information. For example, if not satisfying the second vehicle boarding condition, the first processor 530 may abort the network information monitoring operations (e.g., operation 1001 through operation 1005 or operation 1011 through operation 1015). The network information monitoring operation operates if it is difficult to determine the in vehicle estate merely with the sensor, and may require greater battery consumption than the sensor based operation and utilize communication resource. Hence, the first processor 530 may control not to monitor the network information any more before returning to the first sensor based vehicle boarding recognition process (P1). The first processor 530 may stop the information monitoring operation, and return to the first sensor based vehicle boarding recognition process (P1).

If requesting the base station information or the wireless network information from the second processor 510, the first processor 530 according to various embodiments may request the second processor 510 to stop obtaining the information. For example, if obtaining the base station information or the wireless network information according to user's information acquisition approval, the second processor 510 may stop obtaining the base station information or the wireless network information according to the stop request of the first processor 530. The first processor 530 according to various embodiments may set different confidence levels for utilizing the base station information or the wireless communication information because the two wireless communication means have different error ranges. The base station information which has a broad category may facilitate the determination in a wide means such as a highway, and the wireless network information may facilitate the determination in a road such as downtown. Hence, the confidence level of the base station information or the confidence level of the wireless network information may be reset based on the location information.

The first processor 530 according to various embodiments may measure and compare the base station information and the wireless network information from a P3 entry point. Alternatively, the first processor 530 may use and compare the base station information and the wireless network information recorded from the P1 operation Operation 1001 through operation 1005 may be performed concurrently with operation 1011 through operation 1015, or may be performed before operation 1011 through operation 1015 or after operation 1011 through operation 1015. This is merely an embodiment to ease the understanding of the invention, and is not to limit the configuration of the present invention.

Figure 11:
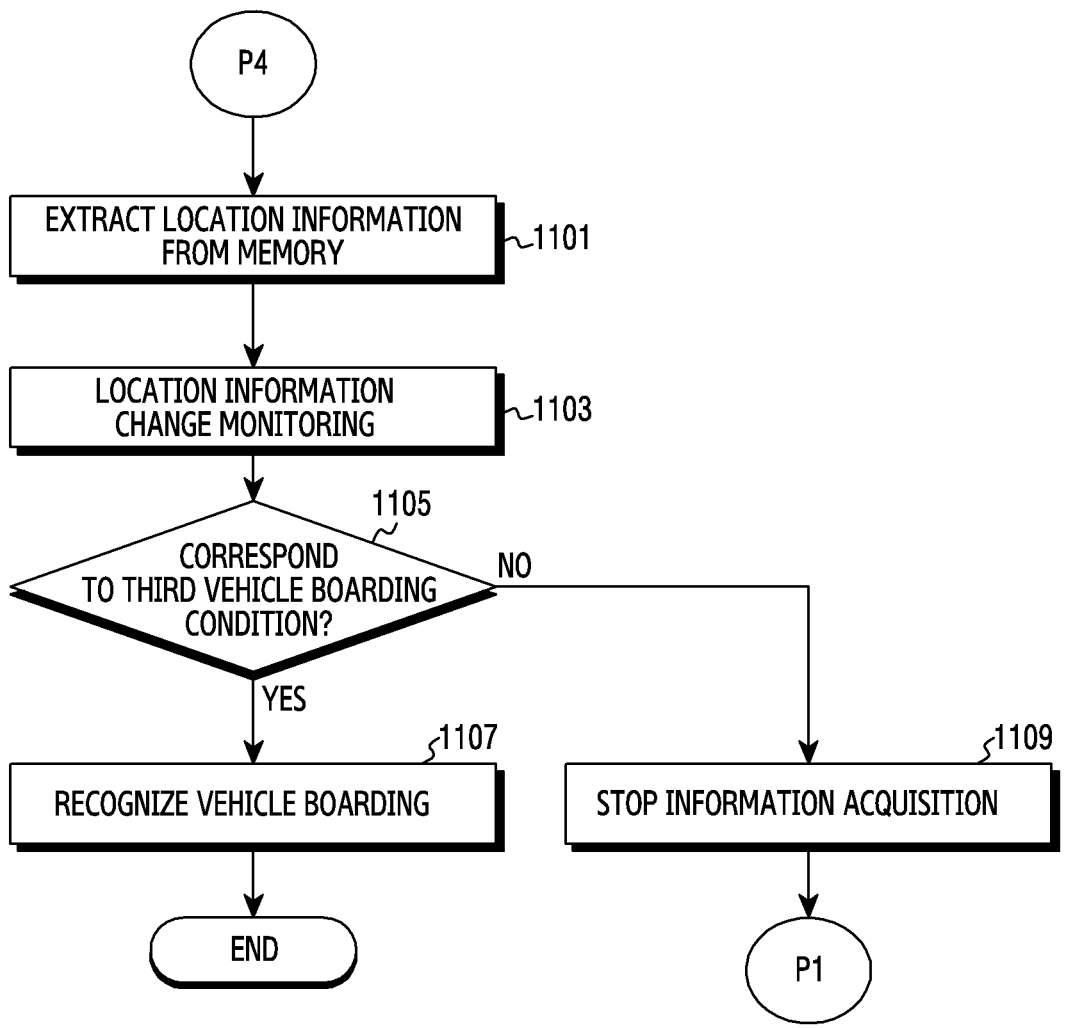
FIG. 11 is a flowchart illustrating a location information based vehicle boarding recognition method according to various embodiments.

FIG. 11 is a flowchart illustrating a location information based vehicle boarding recognition method according to various embodiments.

In FIG. 11 operations, the second processor 510 included in the electronic device 201 according to various embodiments may be in the sleep state. Alternatively, the second processor 510 may wake up to obtain communication information (e.g., at least one of base station information, wireless network information or location information), forward the obtained communication information to the first processor 530, and if the transmission of the communication information is finished, switch to the sleep state. The first processor 530 may store the communication information in at least one memory (e.g., the memory 550). Alternatively, if receiving an information request from the first processor 530, the second processor 510 may wake up and display (e.g., in a popup form) a guide message indicating that the communication information is needed for the vehicle boarding recognition. If the user approves information acquisition based on the guide message, the second processor 510 may obtain the communication information and forward the obtained communication information to the first processor 530.

Referring to FIG. 11, in operation 1101, the electronic device 201 (e.g., the first processor 530) may extract location information from at least one memory (e.g., the memory 550). If performing the vehicle boarding recognition process (P4) by using the location information, it is possible to detect a location change and a speed change. The first processor 530 may determine movement or not using the location information, and determine the in vehicle state by combining results of P1 through P3 and the movement or not based on the location information. If the in vehicle state is not clear through P1 through P3, the first processor 530 may clearly determine the in vehicle state using the location information.

In operation 1103, the electronic device 201 (e.g., the first processor 530) may monitor the change of the location information. For example, the first processor 530 may measure a movement speed using the location information and, if the measured movement speed exceeds a specific speed, determine the in vehicle state. In this case, the first processor 530 does not determine merely with the movement speed using the location information, and may determine the in vehicle state by reflecting a confidence level over a specific level through P1 through P3.

In operation 1105, the electronic device 201 (e.g., the first processor 530) may determine whether it satisfies a third vehicle boarding condition. For example, the third vehicle boarding condition may include location change information or speed information. For example, if detecting a change in the location information but detecting no great change enough to determine the vehicle boarding, the first processor 530 may determine no correspondence to the third vehicle boarding condition. Alternatively, if the location information is the same as or similar to the location change information, the first processor 530 may determine correspondence to the third vehicle boarding condition.

The first processor 530 may perform operation 1107 if corresponding to the third vehicle boarding condition, and may perform operation 1109 if the location information does not correspond to the third vehicle boarding condition.

In operation 1107, the electronic device 201 (e.g., the first processor 530) may recognize the vehicle boarding. According to an embodiment, the first processor 530 may determine that the user is on board the vehicle by considering all of the first sensor, the second sensor, the network information and the location information. If recognizing the vehicle boarding, the first processor 530 may provide various services according to the vehicle boarding. The first processor 530 according to various embodiments may wake up the second processor 510 to provide the service according to the vehicle boarding, and provide the service according to the vehicle boarding by the second processor 510. Alternatively, the first processor 530 may directly provide the service according to the vehicle boarding without waking up the second processor 510.

The first processor 530 according to various embodiments may, during the vehicle boarding recognition, monitor a user state in real time, and secure user's safety based on a monitoring result. For example, the first processor 530 may, during the vehicle boarding recognition, detect a great impact, determine that the user is in danger if not detecting the movement for a specific time duration, and determine a risk check request message to a selected other electronic device (e.g., an electronic device of a parent, an electronic device of a spouse, etc.). The first processor 530 according to various embodiments may arouse user's interest by selectively providing useful information in the vehicle boarding.

In operation 1109, the electronic device 201 (e.g., the first processor 530) may stop acquiring the location information. For example, if not satisfying the third vehicle boarding condition, the first processor 530 may abort the location information acquisition operation (e.g., operation 1101). The location information acquisition operation operates if it is difficult to determine the in vehicle state merely with the sensor or the network information, and may require greater battery consumption than the sensor or network information acquisition operation and utilize considerable communication resource. Hence, the first processor 530 may control not to obtain the location information any more before returning to the first sensor based vehicle boarding recognition process (P1). The first processor 530 may abort the location information acquisition operation, and return to the first sensor based vehicle boarding recognition process (P1).

Figure 12:
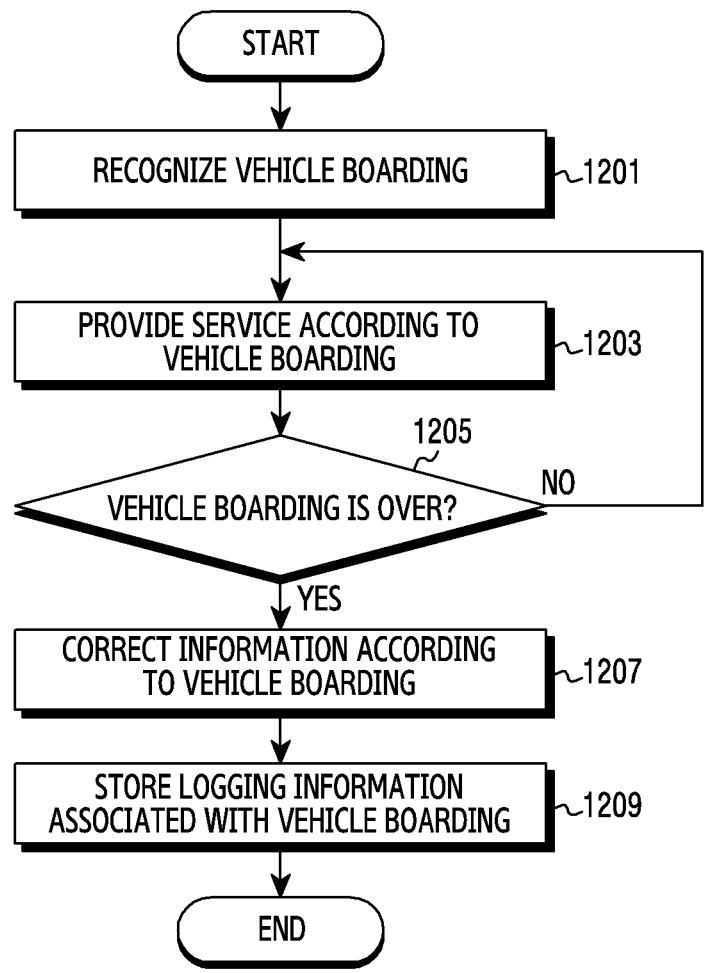
FIG. 12 is a flowchart illustrating a service provision method associated with vehicle boarding of an electronic device according to various embodiments.

FIG. 12 is a flowchart illustrating a service provision method associated with vehicle boarding of an electronic device according to various embodiments.

In FIG. 12 operations, the second processor 510 included in the electronic device 201 according to various embodiments may be in the sleep state. Alternatively, the second processor 510 may wake up to obtain communication information (e.g., at least one of base station information, wireless network information or location information), forward the obtained communication information to the first processor 530, and if the transmission of the communication information is finished, switch to the sleep state. The first processor 530 may store the communication information in at least one memory (e.g., the memory 550). The first processor 530 may continuously check the in vehicle state even in FIG. 12 operations.

Referring to FIG. 12, in operation 1201, the electronic device 201 (e.g., the first processor 530) may recognize vehicle boarding. Since operation 1201 is similar to operation 1107 of FIG. 11, its detailed descriptions are omitted. If recognizing the vehicle boarding by the first processor 530, the first processor 530 may wake up the second processor 510 to provide a service according to the vehicle boarding. The first processor 530 may forward information according to the vehicle boarding to the second processor 510, and the second processor 510 may provide the service according to the vehicle boarding. Alternatively, the first processor 530 may directly provide the service according to the vehicle boarding without waking up the second processor 510.

In operation 1203, the electronic device 201 (e.g., the first processor 530) may provide the service according to the vehicle boarding. If recognizing the vehicle boarding, the first processor 530 may change a mode of the electronic device 201. For example, the first processor 530 may change the mode of the electronic device 201 to a car mode. The car mode may be changed to a voice support mode to facilitate manipulation during the driving, or enlarge information (e.g., time, date, and an icon associated with an application) displayed on the display 260. Alternatively, in the car mode, the first processor 530 may change the electronic device 201 from a ring tone to vibrations or mute, or limit video play (e.g., DMB). The first processor 530 according to various embodiments may forward the vehicle boarding recognized to the second processor 510, and the second processor 510 may provide the service according to the vehicle boarding.

The first processor 530 may adjust a Geofence service according to the vehicle boarding. The Geofence service is a function which determines entering or exiting a specific point (e.g., house, office, a point of interest), and may provide user setting such as alarm based on a location in a specific place. It is necessary to periodically scan the location information or the network information in order to determine Geofence in/out, which consumes considerable current. The first processor 530 may determine a frequency/period for scanning the information based on a distance between a location (or an area) set in the Geofence and a current location (or an area).

For example, if the distance between the current location and the location set in the Geofence is 100 km, a user's current state is walking, and the walking state continues, the first processor 530 may estimate (or predict) arrival at the location set in the Geofence after at least 25 hours based on 4 km/h and increase the information scan period. Alternatively, in the in vehicle state, it may be over at least 20 km/h and faster, and the first processor 530 may estimate the arrival at the location set in the Geofence within 1 hour. In this case, in the in vehicle state, the first processor 530 may reduce the information scan period. On the contrary, even out of the location set in the Geofence, the first processor 530 may adjust the information scan period for supporting the Geofence service according to the walking state, the running state, the bicycle riding state, or the in vehicle state or the not in vehicle state.

In operation 1205, the electronic device 201 (e.g., the first processor 530) may determine whether the vehicle boarding is over. For example, the first processor 530 may determine movement or not using the location information, and determine a vehicle boarding end state (or the not in vehicle state) by integrating results of P1 through P3 and the movement or not based on the location information. For example, the first processor 530 may measure the movement speed using the location information and, if the measured moving speed falls below a reference speed (e.g., 4 km/h), determine the vehicle boarding end state. The first processor 530 may determine the vehicle boarding end state by reflecting confidence levels based on P1 through P4.

In operation 1207, the electronic device 201 (e.g., the first processor 530) may correct the information according to the vehicle boarding. For example, if the in vehicle state is changed to the not in vehicle state, the first processor 530 may store the last location of the detected step as a parking location of the vehicle. The second processor 510 according to various embodiments may guide the vehicle parking location to the user, by displaying the vehicle parking location together with a map on the display 260. Alternatively, if guiding the vehicle parking location, the first processor 530 may display an icon for executing a camera, and thus guide to capture the vehicle parking location by automatically executing the camera if the icon is selected.

The first processor 530 according to various embodiments may determine a position change (e.g., landscape or portrait) of the electronic device, a user's posture change (e.g., lying, sitting, standing, etc.), the movement or not (e.g., halt, walk, run, etc.) using an acceleration sensor. A pedometer may provide the number of steps, a running time, a running distance, and so on by calculating a step period per hour. Yet, the steps may be counted even though the user does not walk or run during the vehicle boarding. The first processor 530 may calibrate the steps by a number misrecognized (or counted wrong) during the vehicle boarding time in information collected during the vehicle boarding. Alternatively, the first processor 530 may not count the steps during the vehicle boarding.

In operation 1209, the electronic device 201 (e.g., the first processor 530) may store logging information associated with the vehicle boarding. The first processor 530 according to various embodiments may collect the logging information according to the vehicle boarding, and control a user life pattern service based on the collected logging information. The electronic device 201 may collect and store the number of steps and running information (e.g., a running distance, a running time) associated with a health service as the logging information. If the logging information is accumulated, the first processor 530 may determine the user life pattern for a week using the logging information. For example, the first processor 530 may predict information regarding which day and when the vehicle is used or public transportation is used. The first processor 530 may infer user's commuting time based on the logging information, and provide music recommendation, traffic information, and famous restaurant information services based on it.

An operating method of an electronic device which includes a plurality of sensors according to various embodiments may include obtaining sensing data from at least one sensor of the plurality of the sensors, estimating an in vehicle state based on the sensing data, and performing a communication information based vehicle boarding recognition process based on the estimated in vehicle estate.

Performing may include, if the sensing data corresponds to a first vehicle boarding condition, obtaining network information from the communication interface of the electronic device.

Performing may further include monitoring the network information, and if the network information corresponds to a second vehicle boarding condition, obtaining location information from the location module of the electronic device.

Performing may further include monitoring the location information, and if the location information corresponds to a third vehicle boarding condition, recognizing an in vehicle state.

Estimating may include monitoring first sensing data from a first sensor, and driving a second sensor if the first sensing data satisfies a first sensing condition.

Driving the second sensor may include monitoring second sensing data from the second sensor, and performing an information based vehicle boarding recognition process using the communication interface or the location module if the second sensing data satisfies a second sensing condition.

The operating method may further include stopping driving the second sensor if the second sensing data does not satisfy the second sensing condition.

A computer readable recording medium according to various embodiments may include a program which executes an operation for obtaining sensing data from at least one sensor of the plurality of the sensors, an operation for estimating an in vehicle state based on the sensing data, and an operation for performing a communication information based vehicle boarding recognition process based on the estimated in vehicle estate.

The computer-readable recording medium may include a hard disk, a floppy disc, a magnetic medium (e.g., a magnetic tape), an optical storage medium (e.g., a compact disc-ROM (CD-ROM) or a DVD, a magnetic-optic medium (e.g., a floptical disc)), and an internal memory. The instruction may include code created by a compiler or code executable by an interpreter. The module or program module according to various embodiments may include at least one or more components of the aforementioned components, omit some of them, or further include additional other components. Operations performed by the module, the program, or another component according to various embodiments may be carried out sequentially, in parallel, repeatedly, or heuristically, or at least some operations may be executed in a different order or omitted, or other operations may be added.

The embodiments disclosed in the specification and the drawings merely present specific examples to easily explain details of the present invention and to ease the understanding, and do not limit the range of the present invention. Therefore, the scope of the present invention should be construed as encompassing all modifications or embodiments derived based on the technical idea of the present invention as well the disclosed embodiments.

The invention claimed is:

1. An electronic device comprising:
   at least one memory;
   a communication interface;
   one or more sensors;
   a location module; and
   at least one processor functionally coupled to the at least one memory, the communication interface, the one or more sensors, and the location module,
   wherein the at least one processor is configured to:
   obtain sensing data from at least one sensor of the one or more sensors,
   if the sensing data corresponds to a first vehicle boarding condition, obtain network information from the communication interface,
   if the network information corresponds to a second vehicle boarding condition, obtain location information from the location module, and
   if the location information corresponds to a third vehicle boarding condition, recognize an in vehicle estate,
   wherein the network information comprises at least one of information on change of base station information per unit time or information on change of wireless network information per unit time.

2. The electronic device of claim 1, wherein the at least one processor comprises a first processor and a second processor,
   wherein the second processor is configured to obtain network information from the communication interface or location information from the location module, and
   the first processor is configured to obtain the sensing data from the one or more sensors.

3. The electronic device of claim 2, wherein the first processor is always in an active state, and
   if transmitting the network information or the location information to the first processor, the second processor is configured to operate selectively in the active state.

4. The electronic device of claim 1, wherein the at least one processor is configured to stop obtaining the network information if the network information does not correspond to the second vehicle boarding condition.

5. The electronic device of claim 1, wherein the at least one processor is configured to stop obtaining the location information if the location information does not correspond to the third vehicle boarding condition.

6. The electronic device of claim 1, wherein the at least one processor is configured to monitor first sensing data from a first sensor, and to drive a second sensor if the first sensing data satisfies a first sensing condition.

7. The electronic device of claim 6, wherein the first sensor is configured to comprise a geomagnetic sensor or an acceleration sensor.

8. The electronic device of claim 6, wherein the at least one processor monitors second sensing data from the second sensor, and controls to perform an information based vehicle boarding recognition process using the communication interface or the location module if the second sensing data satisfies a second sensing condition.

9. The electronic device of claim 6, wherein the second sensor is configured to comprise at least one of a gyro sensor, an E-nose sensor or a sound sensor.

10. The electronic device of claim 8, wherein the at least one processor is configured to stop driving the second sensor if the second sensing data does not satisfy the second sensing condition.

11. The electronic device of claim 1, wherein the at least one processor is configured to apply different confidence levels to the one or more sensors, and to determine if the sensing data corresponds to the first vehicle boarding condition based on the sensing data and sensor confidence levels.

12. The electronic device of claim 1, wherein the at least one processor is configured to apply different confidence levels to the one or more sensors, the communication interface and the location module, and to recognize the in vehicle estate based on the sensing data, the network information or the location information or the applied confidence level.

13. An operating method of an electronic device which comprises a plurality of sensors, a communication interface, and a location module, the method comprising:
    obtaining sensing data from at least one sensor of the plurality of the sensors;
    if the sensing data corresponds to a first vehicle boarding condition, obtaining network information from the communication interface;
    if the network information corresponds to a second vehicle boarding condition, obtaining location information from the location module; and
    if the location information corresponds to a third vehicle boarding condition, recognizing an in-vehicle state,
    wherein the network information comprises at least one of information on change of base station information per unit time or information on change of wireless network information per unit time.

14. An electronic device, comprising:
    at least one memory;
    a communication interface;
    one or more sensors;
    a location module; and
    a first processor and a second processor operably coupled to the at least one memory, the communication interface, the one or more sensors and the location module,
    wherein the second processor is configured to, obtain network information from the communication interface, obtain location information from the location module, and transmit, to the first processor, the network information or the location information, and wherein the network information comprises at least one of information on change of base station information per unit time or information on change of wireless network information per unit time;
    wherein the first processor is configured to
    receive the network information or the location information from the second processor,
    store, in the at least one memory, the received network information or the received location information,
    obtain sensing data from the one or more sensors,
    if the sensing data corresponds to a first vehicle boarding condition, obtain network information from the communication interface,
    if the network information corresponds to a second vehicle boarding condition, obtain location information from the location module, and
    if the location information corresponds to a third vehicle boarding condition, recognize an in-vehicle state.

15. The electronic device of claim 14, wherein the first processor is always operating in an active state, and
    wherein the second processor is selectively operating in the active state when transmitting the network information or the location information to the first processor, and is turned into an inactive state when the transmitting is completed.

16. The electronic device of claim 14, wherein the at least one memory is included in the first processor or is disposed outside of the first processor.

* * * * *